US 9,802,289 B2

(12) United States Patent
Inkster

(10) Patent No.: US 9,802,289 B2
(45) Date of Patent: Oct. 31, 2017

(54) ROTARY GEAR TRANSMISSION FOR TOOLS

(71) Applicant: Arbortech Industries Limited, Malaga (AU)

(72) Inventor: Kevin Inkster, Malaga (AU)

(73) Assignee: Arbortech Industries Limited (AU)

( * ) Notice: Subject to any disclaimer, the term of this patent is extended or adjusted under 35 U.S.C. 154(b) by 0 days.

(21) Appl. No.: 15/028,087

(22) PCT Filed: Oct. 9, 2014

(86) PCT No.: PCT/AU2014/050279
§ 371 (c)(1),
(2) Date: Apr. 8, 2016

(87) PCT Pub. No.: WO2015/051418
PCT Pub. Date: Apr. 16, 2015

(65) Prior Publication Data
US 2016/0236317 A1 Aug. 18, 2016

(30) Foreign Application Priority Data
Oct. 10, 2013 (AU) .............................. 2013903907

(51) Int. Cl.
*B23B 45/16* (2006.01)
*B25D 9/00* (2006.01)
(Continued)

(52) U.S. Cl.
CPC .............. *B24B 23/03* (2013.01); *B24B 23/04* (2013.01); *B24B 27/06* (2013.01); *B24B 27/08* (2013.01);
(Continued)

(58) Field of Classification Search
CPC ...... A61B 19/2203; A61B 2017/00017; A61B 2019/4857; A61B 2017/2927;
(Continued)

(56) References Cited

U.S. PATENT DOCUMENTS

| 770,094 A | 9/1904 | McGill |
| 1,798,059 A * | 3/1931 | Bilgram ................. B23F 15/08 409/38 |

(Continued)

FOREIGN PATENT DOCUMENTS

| AU | 2009904944 | 10/2009 |
| AU | 2013903907 | 10/2013 |

(Continued)

OTHER PUBLICATIONS

Inkster, Kevin; International Search Report and Written Opinion for PCT Application No. PCT/AU2014/050279, filed Oct. 9, 2014, mailed Dec. 22, 2014, 11 pgs.

(Continued)

*Primary Examiner* — Robert Long
(74) *Attorney, Agent, or Firm* — Taylor English Duma LLP

(57) ABSTRACT

A cutting tool mechanism 11 for providing a cutting, abrading or grinding action is disclosed. The mechanism 11 has an inner circular part 17 having teeth 19 extending radially outwardly, a surrounding circular part 25 having inner teeth 27 extending radially inwardly. The circular parts 17 and 25 co-operate by engagement their teeth 19 and 27. Rotation of one circular part causes the other to move constrained by the engagement of the teeth in an orbital, oscillatory or impact motion. An input coupling 81 is provided for transmission of rotary motion, and an output coupling 37 is provided to transmit said orbital, oscillatory or impact motion to a blade 13. In further embodiments, the surrounding circular part 25

(Continued)

can be provided with outwardly extending teeth and surrounded by a further outer circular part with inwardly extending teeth, to cooperate with the outwardly extending teeth, to provide more complex orbital, oscillatory or impact motion.

21 Claims, 32 Drawing Sheets

(51) Int. Cl.
| | |
|---|---|
| B25D 11/00 | (2006.01) |
| B25D 13/00 | (2006.01) |
| B25D 16/00 | (2006.01) |
| E21B 1/00 | (2006.01) |
| B24B 23/03 | (2006.01) |
| B24B 47/00 | (2006.01) |
| B26D 1/00 | (2006.01) |
| F16H 1/20 | (2006.01) |
| F16H 1/28 | (2006.01) |
| B26D 5/08 | (2006.01) |
| B24B 27/08 | (2006.01) |
| B24B 47/12 | (2006.01) |
| B24B 23/04 | (2006.01) |
| F16H 1/32 | (2006.01) |
| B24B 27/06 | (2006.01) |
| B28D 1/04 | (2006.01) |
| B28D 1/06 | (2006.01) |

(52) U.S. Cl.
CPC .............. *B24B 47/00* (2013.01); *B24B 47/12* (2013.01); *B26D 1/00* (2013.01); *B26D 5/08* (2013.01); *B28D 1/04* (2013.01); *B28D 1/045* (2013.01); *B28D 1/06* (2013.01); *F16H 1/20* (2013.01); *F16H 1/28* (2013.01); *F16H 1/32* (2013.01)

(58) Field of Classification Search
CPC ....................... A61B 2017/2929; B25D 16/00; B24B 23/04; B24B 27/08; B24B 47/12; B24B 23/03; B25B 21/02; B25B 21/026; B27B 19/006; B27B 19/008; F16H 1/32; B26D 5/08
USPC ........................................ 173/213, 29–56, 110
See application file for complete search history.

(56) References Cited

U.S. PATENT DOCUMENTS

| | | | | |
|---|---|---|---|---|
| 2,137,893 | A | | 11/1938 | Elder |
| 2,793,661 | A | | 5/1957 | Olson |
| 3,033,251 | A | | 5/1962 | Atkinson |
| 3,037,400 | A | | 6/1962 | Sundt |
| 3,200,493 | A | | 8/1965 | Dodegge |
| 3,203,095 | A | | 8/1965 | Nelson |
| 3,217,566 | A | | 11/1965 | Sanson |
| 3,388,470 | A | | 6/1968 | Ufer |
| 3,554,197 | A | * | 1/1971 | Dobbie ................ B23Q 5/027 30/392 |
| 3,706,474 | A | | 12/1972 | Neuenburg |
| 3,716,916 | A | | 2/1973 | Alexander |
| 3,905,105 | A | | 9/1975 | Tuke |
| 3,978,862 | A | | 9/1976 | Morrison |
| 4,052,928 | A | * | 10/1977 | Pierrat ................ B23F 15/00 409/38 |
| 4,178,747 | A | * | 12/1979 | Williams ............... A01G 3/06 172/15 |
| 4,379,362 | A | | 4/1983 | Getts |
| 4,877,185 | A | * | 10/1989 | Kufrin .................. B05B 3/044 239/242 |
| 5,349,754 | A | | 9/1994 | Wuensch |
| 5,456,011 | A | | 10/1995 | Inkster |
| 5,846,244 | A | | 12/1998 | Cripe |
| 6,263,579 | B1 | | 7/2001 | Nagashima |
| 6,264,211 | B1 | * | 7/2001 | Granado ............ B23D 57/0076 173/29 |
| 7,191,847 | B2 | * | 3/2007 | Haas ...................... B23D 51/16 173/114 |
| 7,204,026 | B2 | * | 4/2007 | Phillips ................. B23D 49/11 30/340 |
| 7,431,635 | B2 | * | 10/2008 | Dong ...................... B24B 5/40 451/51 |
| 7,658,012 | B2 | * | 2/2010 | James .................... B23D 51/16 30/392 |
| 7,975,347 | B1 | * | 7/2011 | Moses ...................... A47L 1/05 15/236.02 |
| 8,757,285 | B2 | * | 6/2014 | Weber .................... B24B 23/04 173/216 |
| 2002/0056558 | A1 | * | 5/2002 | Bongers-Ambrosius ............................. B25D 11/12 173/201 |
| 2009/0000858 | A1 | | 1/2009 | Ikegaya |
| 2009/0078066 | A1 | | 3/2009 | Schuler |
| 2011/0030524 | A1 | | 2/2011 | Inkster |
| 2011/0036609 | A1 | * | 2/2011 | Blickle ................. B24B 23/028 173/213 |
| 2011/0230303 | A1 | * | 9/2011 | Yorukoglu .............. B30B 1/266 475/331 |
| 2011/0315413 | A1 | * | 12/2011 | Fisher ...................... B25F 3/00 173/1 |
| 2012/0170976 | A1 | * | 7/2012 | Cai .......................... B27B 5/32 403/359.1 |
| 2013/0231211 | A1 | | 9/2013 | Samie |
| 2014/0018811 | A1 | | 1/2014 | Mootlen |

FOREIGN PATENT DOCUMENTS

| | | |
|---|---|---|
| DE | 872857 C | 12/1954 |
| DE | 4140836 | 6/1993 |
| EP | 0546861 | 6/1993 |
| WO | 8903290 | 4/1989 |
| WO | 9214587 | 9/1992 |
| WO | 0965187 | 5/2009 |
| WO | 2011044615 | 4/2011 |

OTHER PUBLICATIONS

Inkster, Kevin Ross; Final Office Action for U.S. Appl. No. 13/501,455, filed Apr. 12, 2012, mailed Mar. 3, 2015, 10 pgs.
Inkster, Kevin Ross; International Preliminary Report on Patentability for PCT/AU2010/001340, filed Oct. 12, 2010, mailed Apr. 17, 2012, 5 pgs.
Inkster, Kevin Ross; International Search Report and Written Opinion for PCT/AU2010/001340, filed Oct. 12, 2010, mailed Nov. 23, 2010, 7 pgs.
Inkster, Kevin Ross; Non-Final Office Action for U.S. Appl. No. 13/501,455, filed Apr. 12, 2012, mailed Nov. 14, 2014, 20 pgs.
Inkster, Kevin Ross; Restriction Requirement for U.S. Appl. No. 13/501,455, filed Apr. 12, 2012, mailed Sep. 11, 2014, 8 pgs.
Inkster, Kevin Ross; U.S. Application entitled: Oscillating Blade Improvement having U.S. Appl. No. 13/501,455, filed Apr. 12, 2012, 22 pgs.
Derwent Soviet Inventions Illustrated, Apr. 1973, Misc P6, SU 337270 (V.L. Chemical Inc. Plant Installation Technol; Des. Inst.) May 26, 1972, 3 pgs.
Inkster, Kevin; International Preliminary Report on Patentability for PCT Application No. PCT/AU2014/050279, filed Oct. 9, 2014, mailed Oct. 29, 2015, 38 pgs.

* cited by examiner

ROTARY GEAR TRANSMISSION FOR TOOLS

TECHNICAL FIELD

This invention relates to cutting, grinding and abrading tools, and in particular to a mechanism for providing a cutting/grinding/abrading action in a tool, and tools incorporating such a mechanism.

BACKGROUND ART

The following discussion of the background art is intended to facilitate an understanding of the present invention only. It should be appreciated that the discussion is not an acknowledgement or admission that any of the material referred to was part of the common general knowledge as at the priority date of the application.

Throughout the specification unless the context requires otherwise, the word "comprise" or variations such as "comprises" or "comprising", will be understood to imply the inclusion of a stated integer or group of integers but not the exclusion of any other integer or group of integers.

The inventor has in the past developed tools which use an oscillatory or orbital action which can cut through materials including brick. These tools are described in PCT/AU1992/000071 and PCT/AU2008/001735, and have been manufactured and sold under the trade marks Arbortech and Allsaw. These tools have two side by side toothed blades which move in an alternating push-pull oscillatory motion about opposed orbits. While these tools are particularly good at cutting friable material and some harder material such as brickwork, they find some other harder materials, particularly harder concretes, and concrete having reinforcing steel, particularly challenging.

It is an object of this invention to provide a mechanism for a tool to allow the cutting of hard materials and rock. It is also an object of the invention to provide in different forms, tools using such a mechanism in various different configurations.

SUMMARY OF INVENTION

In accordance with one aspect of the present invention, there is provided a cutting abrading or grinding tool mechanism for converting a rotary motion to an orbital, oscillatory or impact motion for use in a cutting, abrading or grinding tool, said mechanism having:

an inner circular part having teeth members extending radially outwardly;

where said inner circular part has fewer teeth members than the number of inner teeth members of said surrounding circular part;

where said inner circular part co-operates with said surrounding circular part by engagement of said inner circular part teeth members with said surrounding circular part teeth members;

where, as one said circular part rotates, the other said circular part may move constrained by the engagement of said teeth members to provide an orbital, oscillatory or impact motion in the other said circular part;

and said mechanism has an input coupling for transmission of rotary motion thereto, and a said circular part has an output coupling to which a blade is fastened in a completed tool, to transmit said orbital, oscillatory or impact motion, so that in said completed tool said blade oscillates between a maxima away from and a minima toward a central axis of the input coupling.

The output coupling may be a flange or a mounting point to which a blade is fastened in a completed tool, or the blade and the said circular part may be formed integrally as a unitary construction. Thus the output coupling is merely the part or portion that extends between the said circular part and the cutting, abrading or grinding surface.

The mechanism operates on the principle that there is a differential number of teeth between the cooperating parts, which allows the teeth to ride along and over each other, to produce the resultant motion in the circular part to which the output coupling is attached.

Preferably said inner circular part has one fewer teeth members than the number of inner teeth members of said surrounding circular part.

Preferably said output coupling is connected with said surrounding circular part, and said input coupling is connected with said inner circular part.

Alternatively said output coupling is connected with said inner circular part, and said input coupling is connected with said surrounding circular part.

Preferably said surrounding circular part has outer teeth members extending radially outwardly, and said mechanism includes an outer circular part having inner teeth member extending radially inwardly;

where said surrounding circular part has fewer outer teeth members than the number of inner teeth members of said outer circular part;

where said surrounding circular part co-operates with said outer circular part by engagement of said surrounding circular part teeth members with said outer circular part teeth members.

Preferably said surrounding circular part has one fewer outer teeth members than the number of inner teeth members of said outer circular part.

Thus in accordance with a second aspect of the present invention, there is provided a cutting abrading of grinding tool mechanism for converting a rotary motion to an orbital, oscillatory or impact motion for use in a cutting, abrading or grinding tool, said mechanism having an inner circular part having teeth members extending radially outwardly;

a surrounding circular part having inner teeth members extending radially inwardly, and outer teeth members extending radially outwardly;

an outer circular part having inner teeth member extending radially inwardly where said inner circular part co-operates with said surrounding circular part by engagement of said inner circular part teeth Members with said surrounding circular part teeth members;

where said surrounding circular part co-operates with said outer circular part by engagement of said surrounding circular part teeth members with said outer circular part teeth members;

where said inner circular part has fewer teeth members than the number of inner teeth members of said surrounding circular part, and said surrounding circular part has fewer outer teeth members than the number of inner teeth members of said outer circular part;

where, as one said circular part rotates, another said circular part moves constrained by the engagement of said teeth members to provide an orbital, oscillatory or impact motion in the other said circular part; and said mechanism has an input coupling for transmission of rotary motion thereto, and a said circular part has an output coupling to which a blade is fastened in a completed tool, to transmit said orbital, oscillatory or impact motion, so that in said completed tool said blade oscillates between a maxima away from and a minima toward a central axis of the input coupling.

Preferably said inner circular part has one fewer teeth members than the number of inner teeth members of said surrounding circular part, and said surrounding circular part has one fewer outer teeth members than the number of inner teeth members of said outer circular part.

Preferably the output coupling is connected with said surrounding circular part, said input coupling is connected with said inner circular part, and the outer circular part is restrained as a stator.

Alternatively, preferably the output coupling is connected with said surrounding circular part, said input coupling is connected with said outer circular part, and the inner circular part is restrained as a stator.

As a further alternative, preferably the output coupling is connected with said surrounding circular part, said input coupling is connected with said inner circular part, and the outer circular part is connected to a further input coupling for transmission of rotary motion thereto. The input coupling and further input coupling may be driven together or independently driven.

Preferably the input coupling and further input coupling are independently driven, and there is provided independent control of the rotational velocity of motors driving the input coupling and further input coupling, or differential control of the rotational velocity of the rotary motion.

In accordance with a third aspect of the present invention there is provided a cutting, abrading or grinding tool having a mechanism as described above, having a blade attached to the output coupling, and having a motor connected for transmission of rotary motion to the input coupling. The motor may be an electric motor or a small IC engine, a pneumatically operated motor or a hydraulic motor.

In accordance with a fourth aspect of the present invention there is provided a cutting, abrading or grinding tool having a mechanism as described above, and having a motor connected for transmission of rotary motion to the input coupling and to the further input coupling. The rotary motion transmitted to the input coupling and to the further input coupling should be in opposite directions, or the result will be primarily rotation of the entire mechanism. A blade is attached to the output coupling.

Preferably there is included transmission componentry to transmit rotary motion to the input coupling and to the further input coupling in opposite directions.

Preferably the motor is connected via a differential drive mechanism to allow the operator to vary the differential speed of rotary motion to the input coupling and to the further input coupling. This may be achieved by selective braking of either output of the differential mechanism.

In accordance with a fifth aspect of the present invention there is provided a cutting, abrading or grinding tool having a mechanism as described above, having a blade attached to the output coupling, and having a first motor connected for transmission of rotary motion to the input coupling and having a second motor connected for transmission of rotary motion to the further input coupling, with the relative speeds of the first motor and second motor being controllable to adjust the movement of the output coupling.

Preferably the motors are hydraulic rotary motors and valves are utilised to vary the flow/pressure to the hydraulic motors, to effect relative differential speed control.

In accordance with a sixth aspect of the present invention, there is provided a cutting, abrading or grinding tool having a mechanism as described above, and having a motor connected for transmission of rotary motion to the input coupling, and having a blade attached to the output coupling extending radially from one side of the axis of the output coupling, and having an anchor extending from a side of the axis of the output coupling spaced circumferentially from said blade to partially restrain motion of the output coupling.

Preferably the blade is arcuate in configuration.

Preferably the anchor extends from a circumferential position attached relative to said output coupling substantially opposite circumferentially to where said blade attaches to said output coupling. The effect of the anchor is to anchor a portion of the anchor coupling to the chassis and exaggerate movement of said blade Preferably said anchor comprises a resiliently flexible member. This may be in the form of a piece of spring steel.

BRIEF DESCRIPTION OF DRAWINGS

Several preferred embodiments of mechanisms according to the invention, and of tools incorporating those mechanisms will now be described in the following description made with reference to the drawings, in which:

FIGS. 11 to 17 illustrate a mechanism and blade for cutting, abrading or grinding tool, in a third embodiment;

FIGS. 11a to 17a illustrate the blade tip trajectory for the blades of FIGS. 11 to 17;

FIG. 19a illustrates the blade tip trajectory for the bottom of the blade in the fourth embodiment;

DESCRIPTION OF EMBODIMENTS

Figure 1:
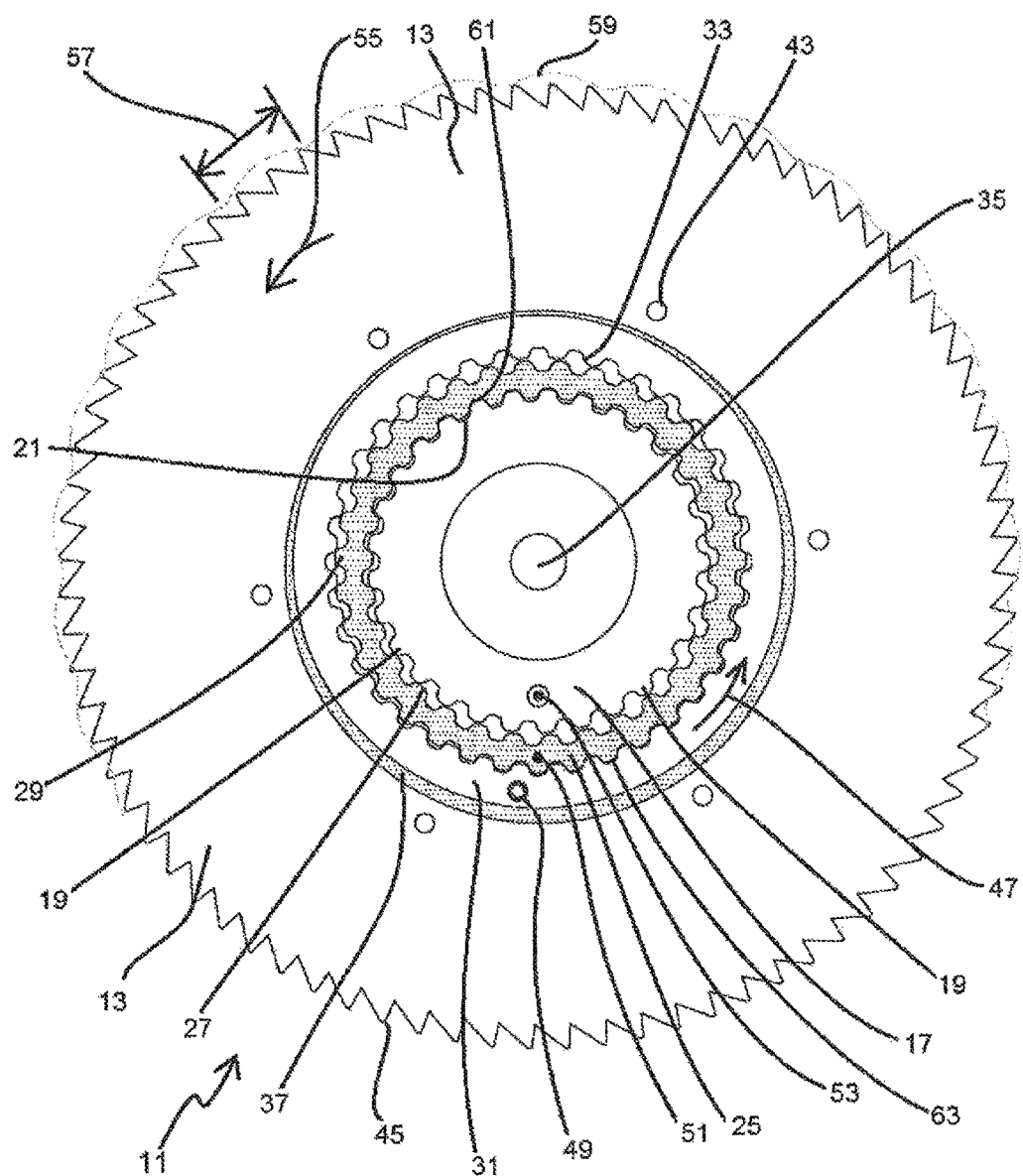
FIGS. 1 to 5 illustrate a mechanism and blade for a cutting, abrading or grinding tool, in a first embodiment.
Figure 2:
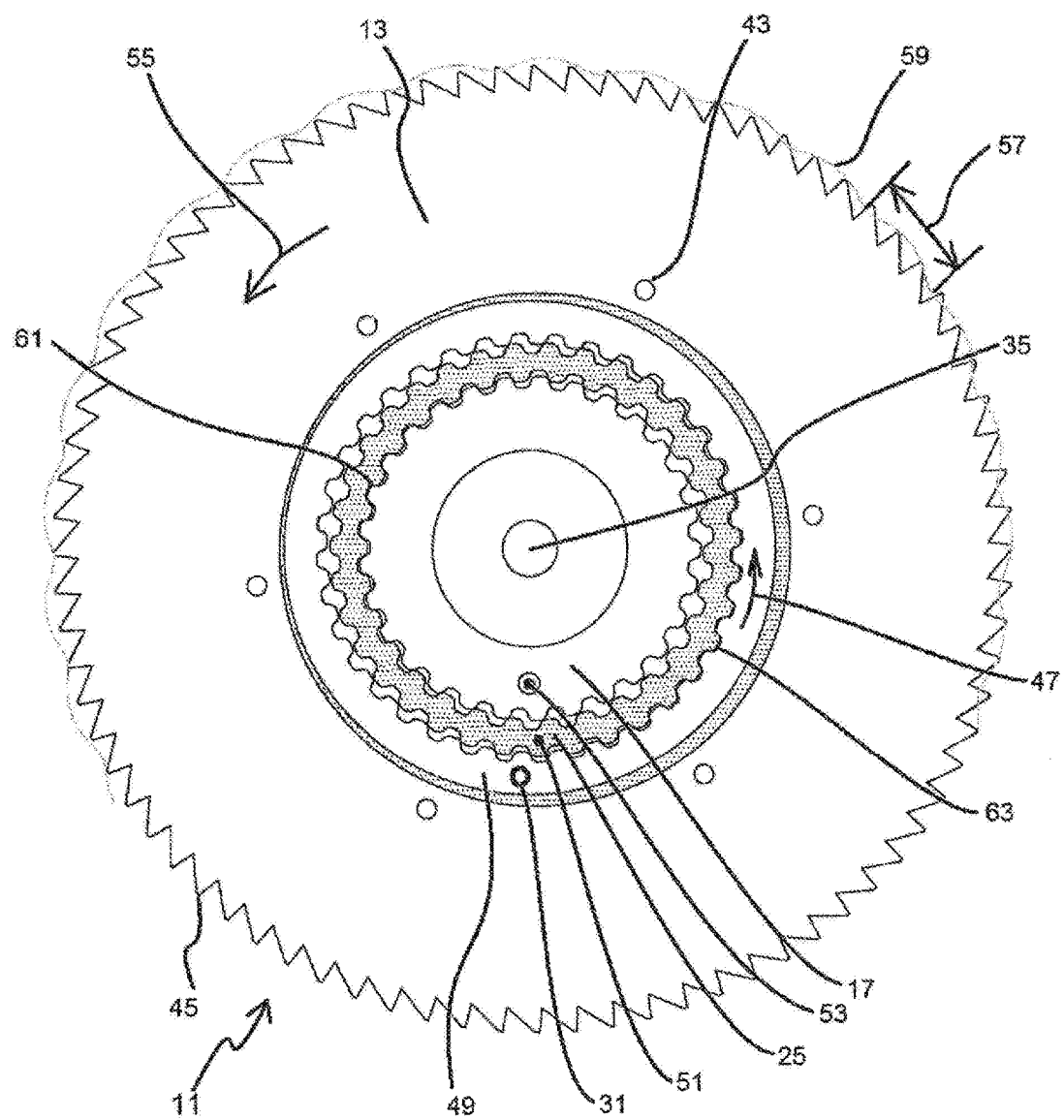
Figure 3:
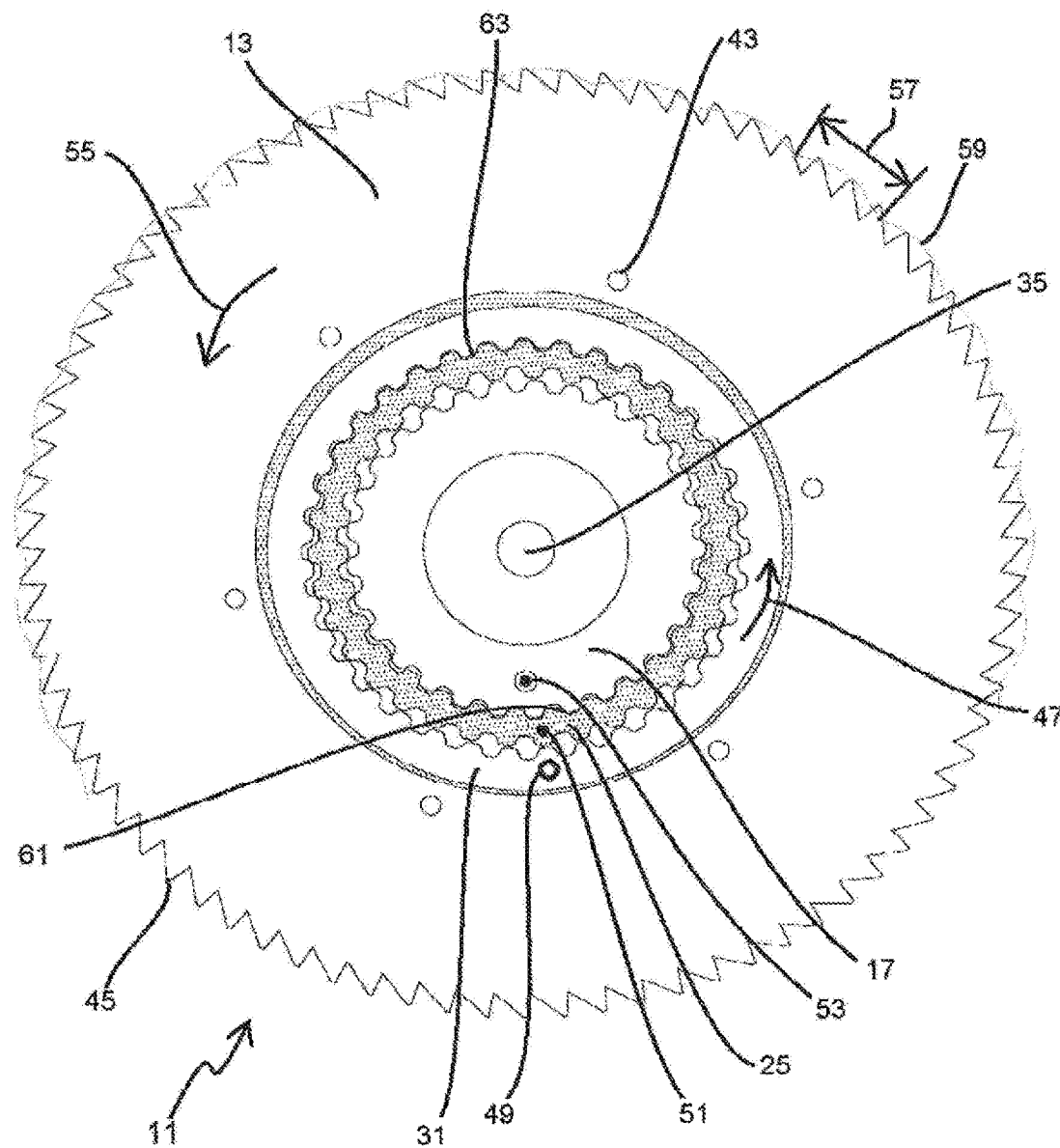
Figure 4:
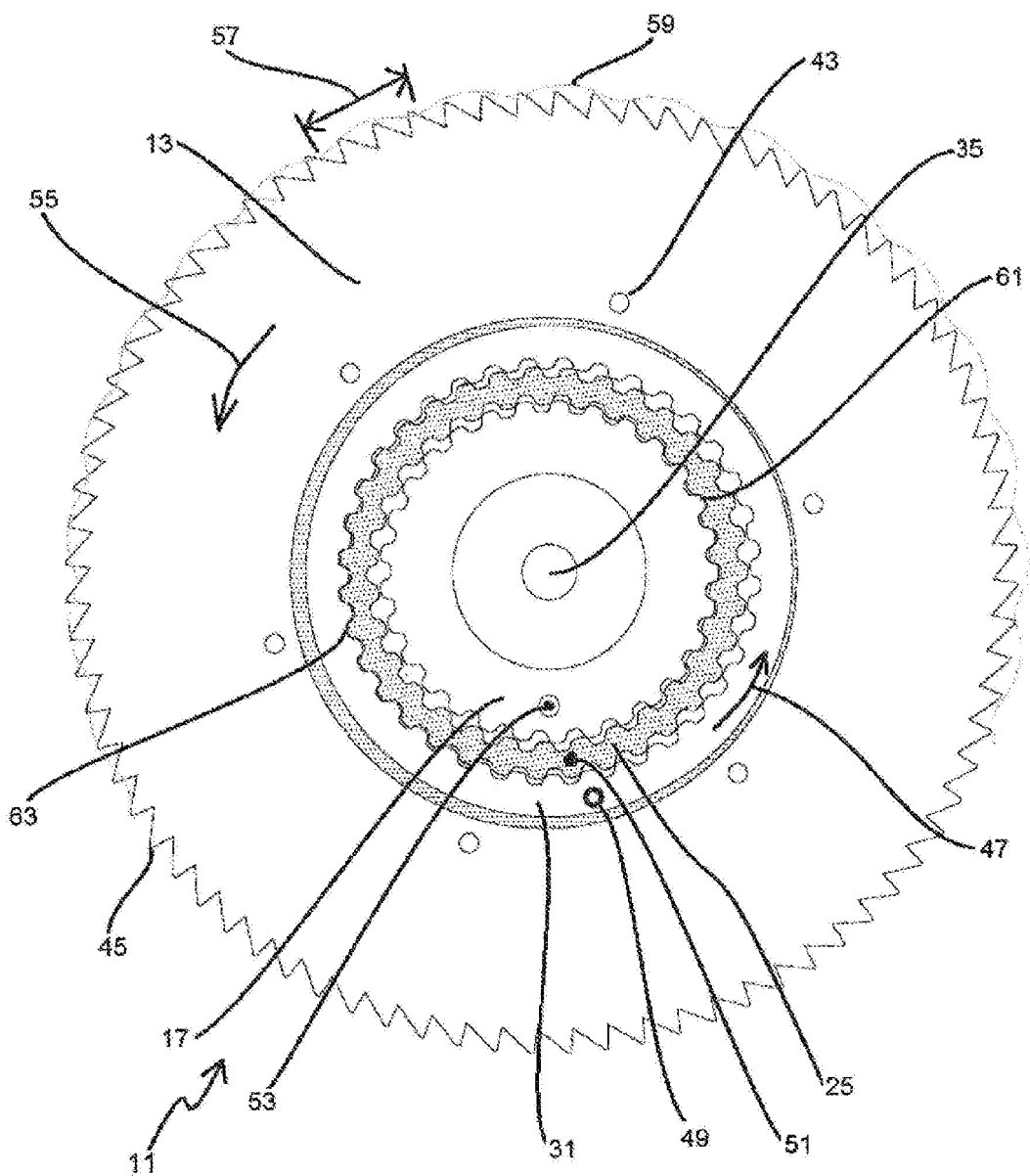
Figure 5:
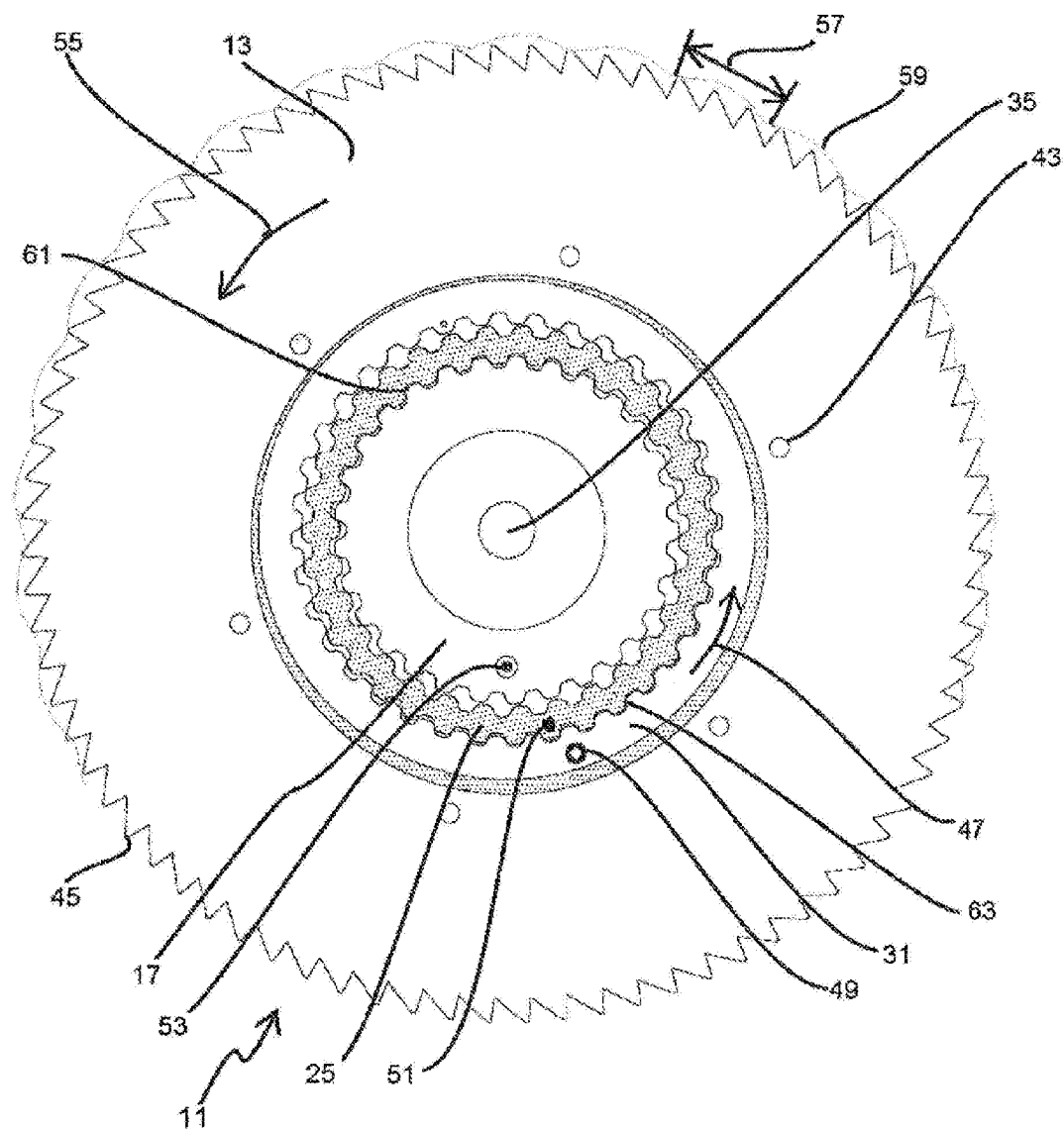
Figure 6:
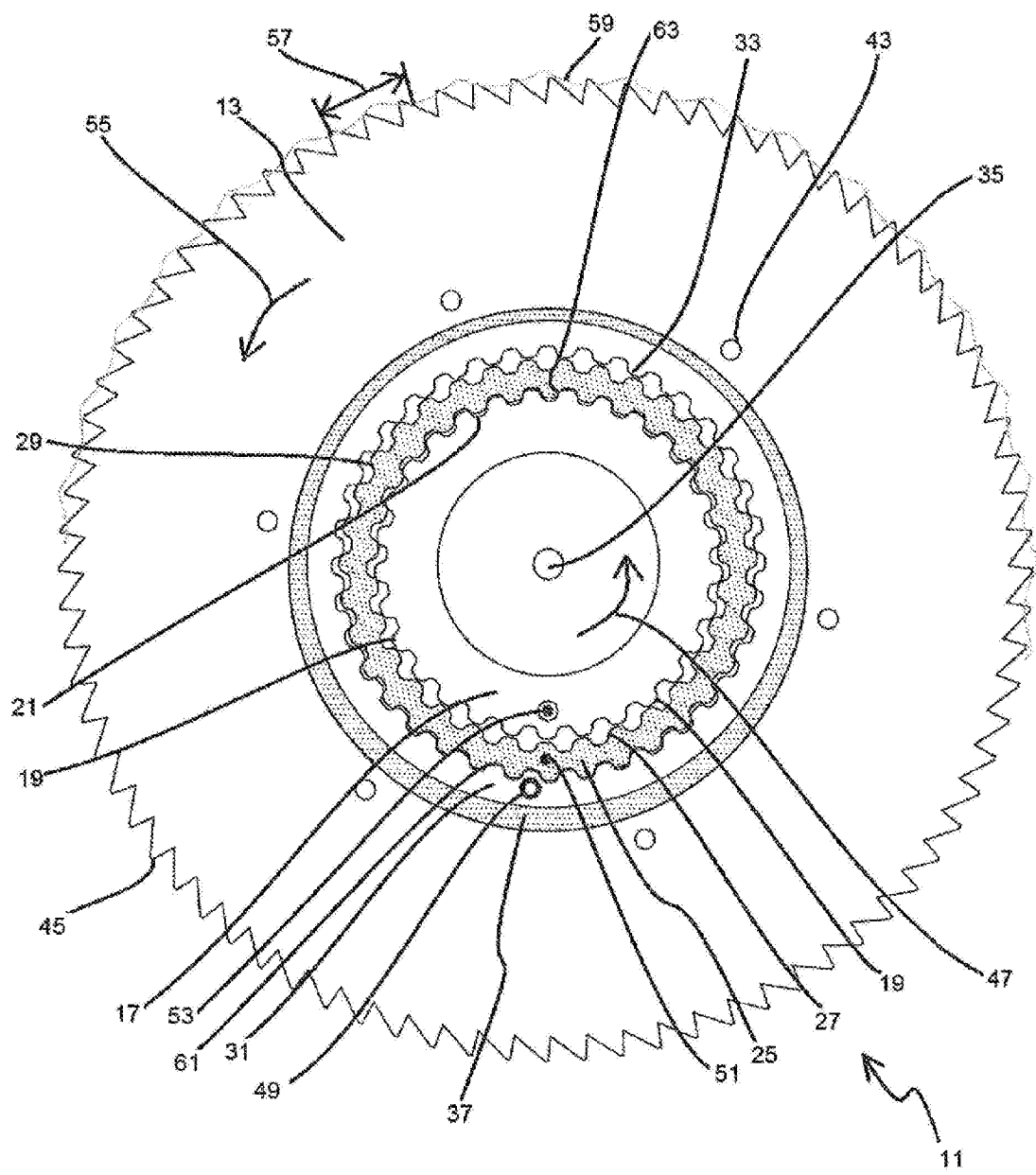
FIGS. 6 to 10 illustrate a mechanism and blade for a cutting, abrading or grinding tool, in a second embodiment.
Figure 7:
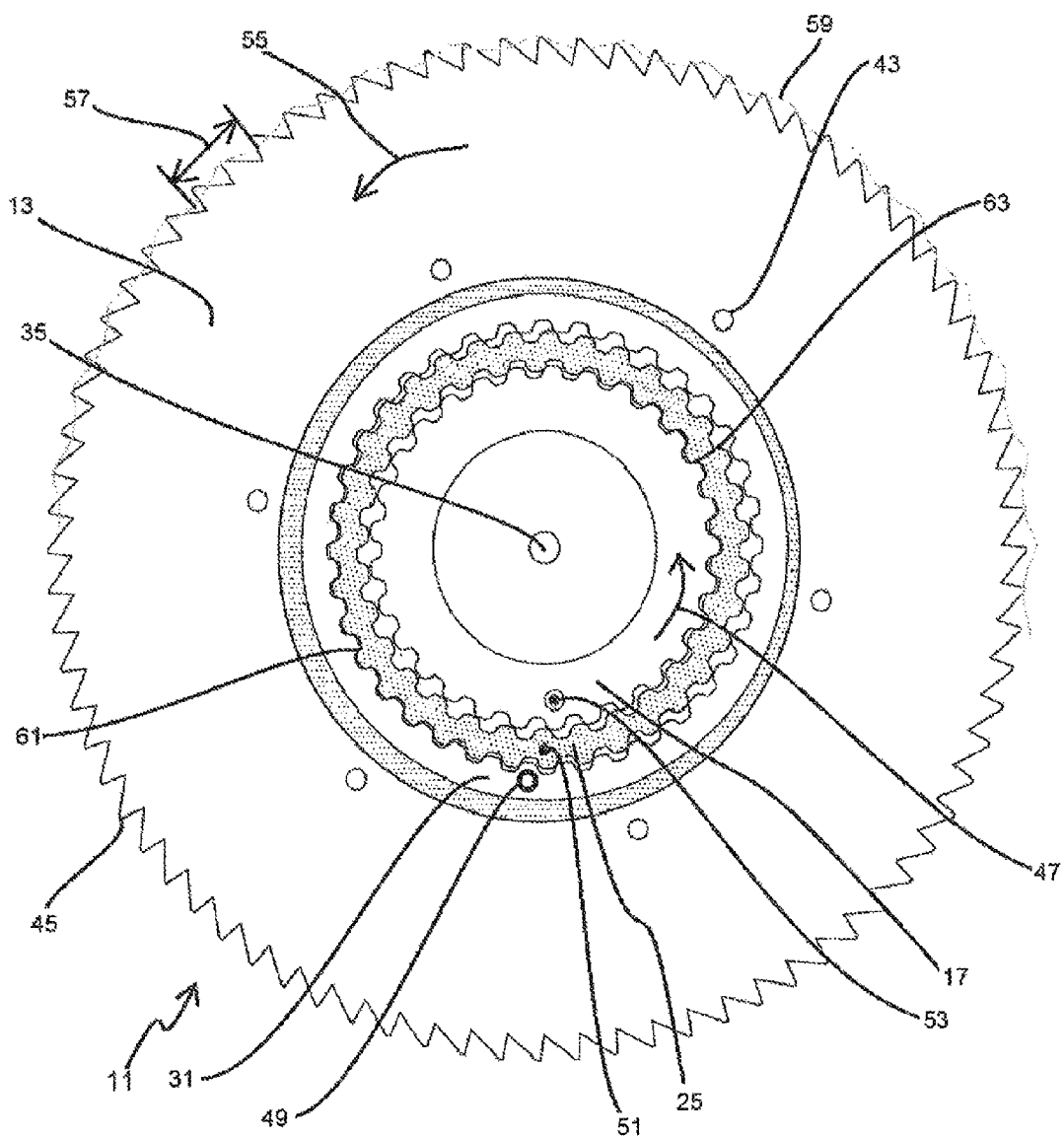
Figure 8:
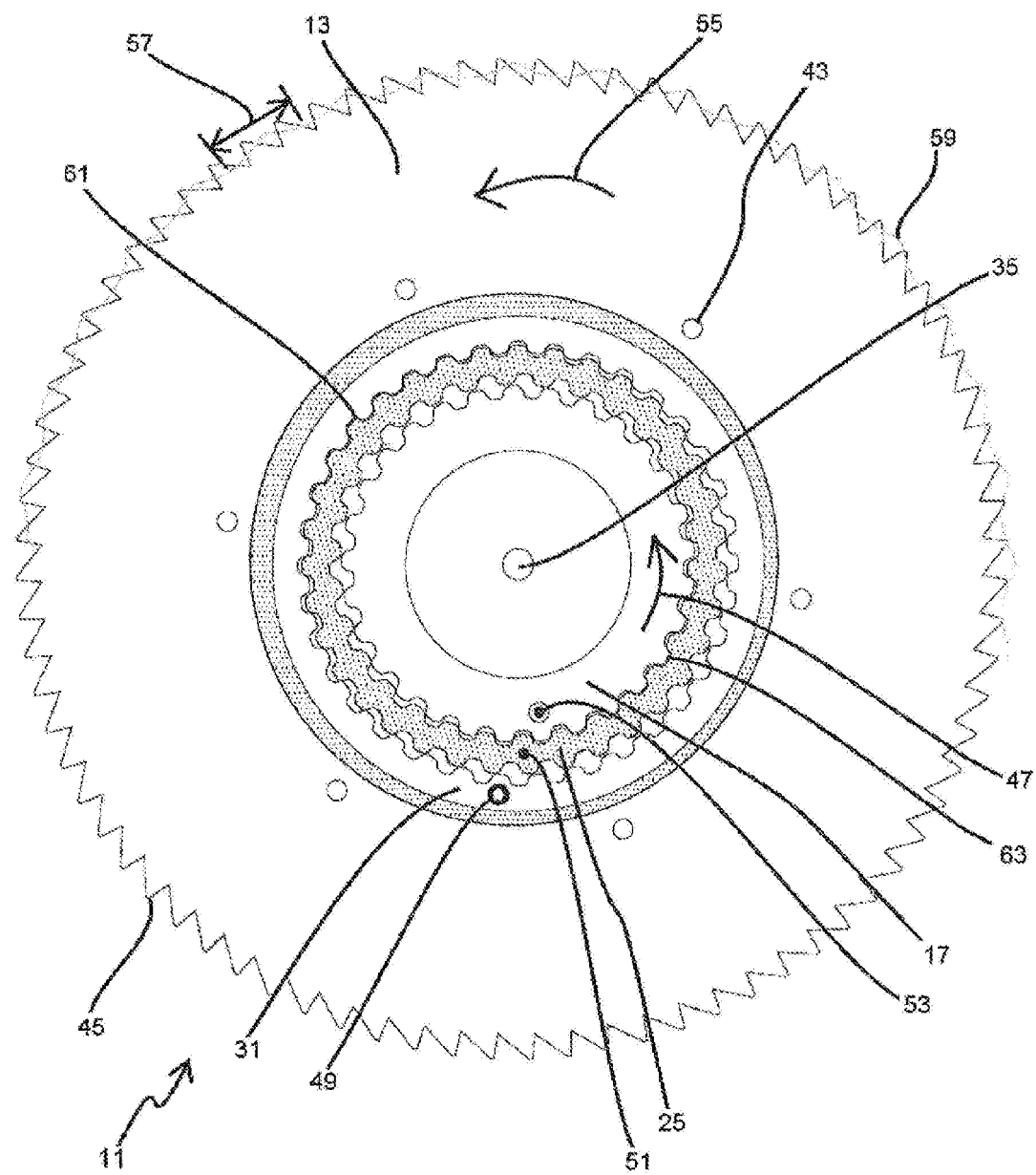
Figure 9:
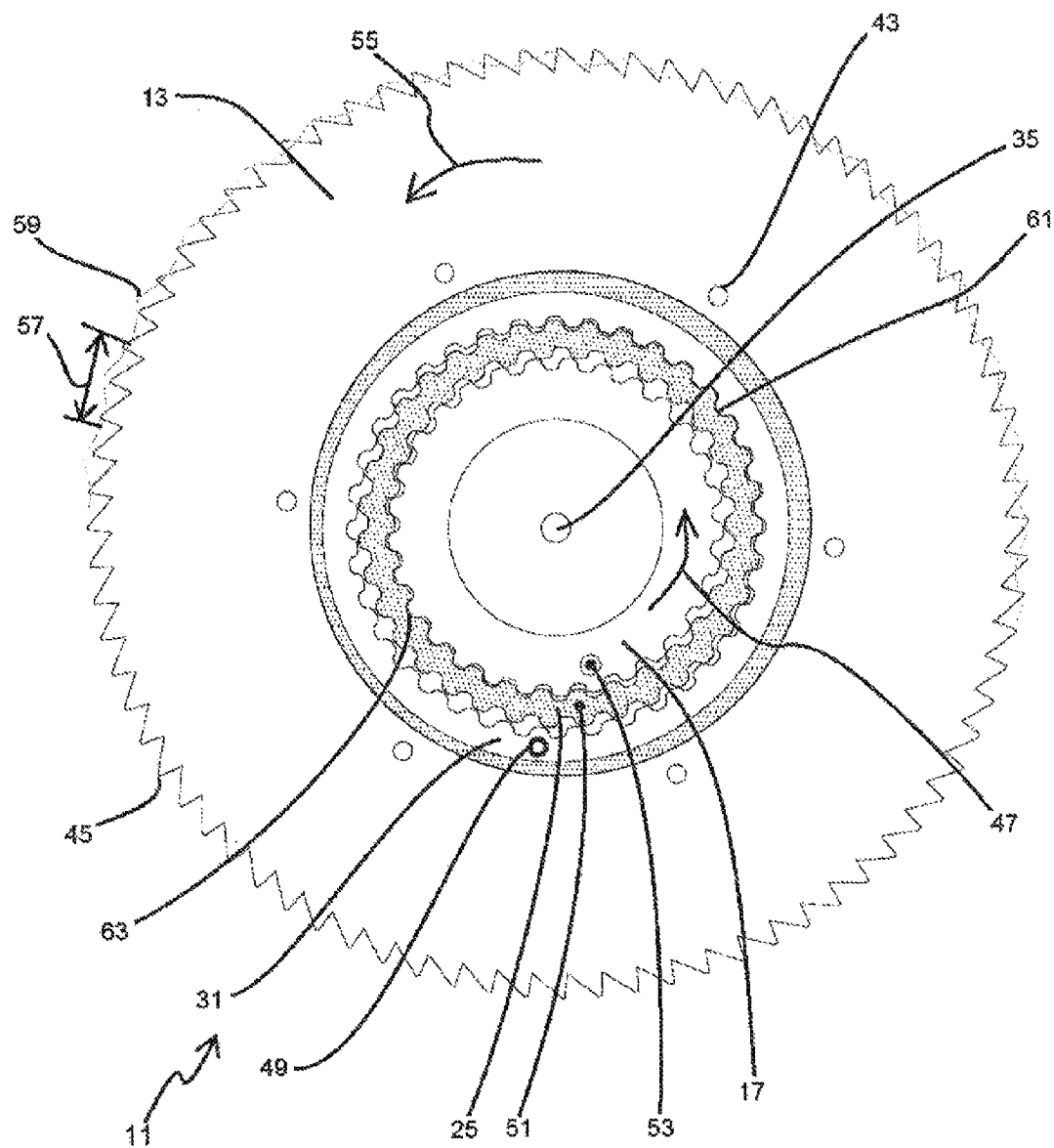
Figure 10:
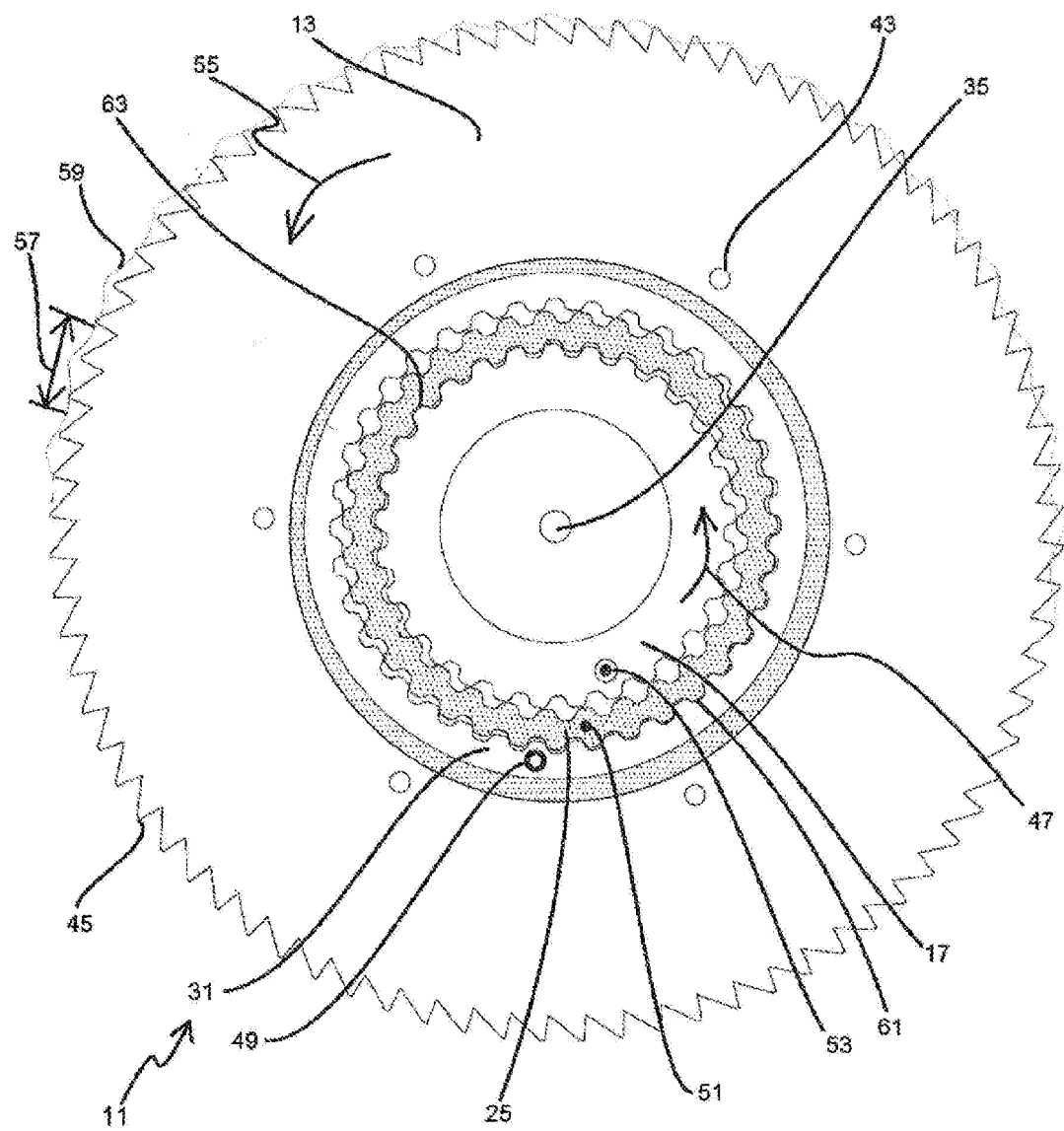

The first embodiment shown in FIGS. 1 to 5 is a mechanism 11 for converting a rotary motion to an orbital, oscillatory or impact motion. This motion can be transmitted to a blade 13 for use in a cutting, abrading or grinding tool 15. The tool has particular application for cutting concrete, and is capable of doing so at speeds that match or exceed high speed diamond cutting blades, without creating a dust hazard, and without creating excessive heat and internal stresses that might otherwise lead to failure of the tool. Further advantages will be discussed in the following pages.

The mechanism 11 of the first embodiment has an inner circular part in the form of an inner cog 17 having teeth members in the form of teeth 19 (see FIG. 1) which extend radially outwardly from the circumferential surface 21 of the inner cog 17. The teeth 19 comprise ridges with intervening troughs extending along and spaced from the central axis of the inner cog 17, the shape of the teeth (ridges and troughs) being roughly sinusoidal. In use, in this first embodiment, the inner cog 17 is fixed to the chassis 23 of the tool 15 to form a stator.

The mechanism 11 has a surrounding circular part in the form of a floating cog 25 having inner teeth members in the form of inwardly extending teeth 27 that extend radially inwardly to mate interferingly with coincident teeth 19, and outer teeth members in the form of outwardly extending teeth 29 which extend radially outwardly. The teeth 27 and 29 comprise ridges with intervening troughs that extend in an axial direction spaced from the central axis of the floating cog 25, and have a shape that is roughly sinusoidal.

The mechanism 11 has an outer circular part in the form of an outer cog 31 with inner teeth members in the form of inwardly extending teeth 33 that extend radially inwardly to mate interferingly with coincident teeth 29. The teeth 33 comprise ridges with intervening troughs that extend in an axial direction spaced from the central axis of the outer cog 31 and have a shape that is roughly sinusoidal.

The inner cog 17 has an average circumference in the region of its teeth 19 that is smaller than the average inner circumference of the floating cog 25 in the region of its inwardly extending teeth 27. The inner cog 17 has fewer teeth 19 than the number of inwardly extending teeth 27 of the floating cog 25. The region of the teeth 19 of the inner cog 17 could be considered as having a smaller average circumference (taking into account the undulations of the teeth) than the inner average circumference of the region of the teeth 27 of the floating cog, by virtue of it fitting within the confines of the surrounding circular part.

Similarly, the floating cog 25 has an average outer circumference in the region of its outwardly extending teeth 29 that is smaller than the average inner circumference of the outer cog 31 in the region of its inwardly extending teeth 33. The floating cog 25 has fewer outwardly extending teeth 29 than the number of inwardly extending teeth 33 of the outer cog 31.

The inner cog 17 part co-operates with the floating cog 25 by meshing of teeth 19 with teeth 27, and the floating cog 25 co-operates with the outer cog 31 by meshing of teeth 29 with teeth 33. The meshing teeth have matching pitch for maximum efficiency and minimal power loss.

The inner cog and outer cog 31 have a common central axial extent 35, while the central axial extent of the floating cog 25 is displaced from the common central axial extent 35. In operation the central axial extent of the floating cog 25 orbits the common central axial extent 35, dictated by the meshing teeth.

In this first embodiment, an output coupling in the form of a blade mount including a flange 37 is provided, to which the blade 13 is attached by rivets 43. The flange 37 is fixed to and moves with the floating cog 25, according to the motion imparted to the floating cog 25 by operation of the mechanism 11. The blade is provided with cutting teeth 45.

As discussed above, the inner cog 17 is fixed to the chassis 23 of the tool 15 in a manner that does not allow rotation, and so forms a stator. An input coupling (not shown) transmits rotary motion to the outer cog 31 in a rotational direction indicated by arrow 47. The relative positions of outer cog 31, floating cog 25 and inner cog 17 are shown by marker 49, 51, and 53 respectively, and the progression of relative movement of the cogs 31, 25, and 17 is shown in the sequence through one cycle illustrated in FIGS. 1 to 5, for only a slight rotation of outer cog 31. As can be seen, for a relatively slight rotation of outer cog 31, there is a rapid oscillation of the floating cog 25. The blade 41, being attached to the floating cog 25 rotates in the direction indicated by arrow 55, and for one oscillatory cycle of the floating cog 25, moves the distance indicated at 57. In operation a tooth of the blade 41 will trace a path indicated at 59.

In FIGS. 1 to 5, the position where the teeth 19 fully mesh with the teeth 27 is indicated at 61, and the position where the teeth 29 fully mesh with teeth 33 is indicated at 63.

The second embodiment is shown in FIGS. 6 to 10, and is structurally the same as the first embodiment, except that the outer cog 31 is fixed to the chassis 23 of the tool 15 in a manner that does not allow rotation, and so forms a stator. An input coupling (not shown) transmits rotary motion to the inner cog 17 in a rotational direction indicated by arrow 47. The relative positions of outer cog 31, floating cog 25 and inner cog 17 are shown by marker 49, 51, and 53 respectively, and the progression of relative movement of the cogs 31, 25, and 17 is shown in the sequence through one cycle illustrated in FIGS. 6 to 10, for only a slight rotation of inner cog 17. As can be seen, for a relatively slight rotation of inner cog 17, there is a rapid oscillation of the floating cog 25. The blade 41, being attached to the floating cog 25 rotates in the direction indicated by arrow 55, and for one oscillatory cycle of the floating cog 25, moves the distance indicated at 57. In operation a tooth of the blade 41 will trace a path indicated at 59.

In FIGS. 6 to 10, the position where the teeth 19 fully mesh with the teeth 27 is indicated at 61, and the position where the teeth 29 fully mesh with teeth 33 is indicated at 63.

The third embodiment is illustrated in FIGS. 11 to 17 and is structurally the same as the first and second embodiments. In the third embodiment, an input coupling (not shown) transmits rotary motion to the inner cog 17 in a rotational direction indicated by arrow 47. A further input coupling (not shown) transmits rotary motion to the outer cog 31 in a rotational direction indicated by arrow 67. While the two input couplings could be driven from the same motor at the same speed, the arrangement of the mechanism having two separate inputs allows two separate motors to be employed, with their speed (and direction, hence velocity) to be controlled independently, so imparting different movement paths of the floating cog 25 and hence teeth 45 of the blade 13.

The blade 13, being attached to the floating cog 25 rotates in the direction indicated by arrow 55. In operation a tooth of the blade 41 will trace a path indicated at 59.

Figure 11:
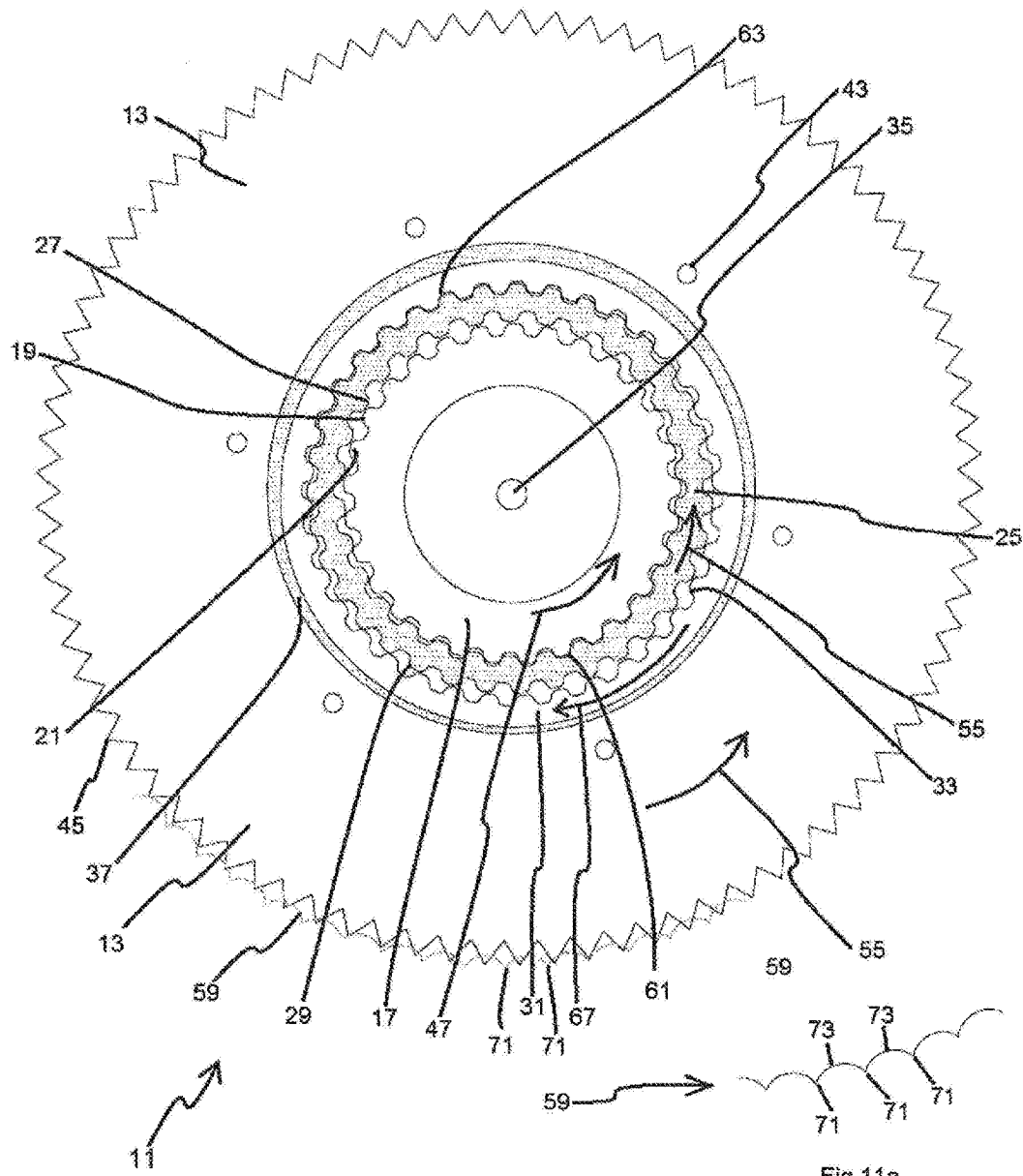

In FIG. 11, the path 59 is shown for the inner cog 17 of the mechanism being driven at −14 (anticlockwise) speed relative to the outer cog 31 driven speed of +4 (clockwise). The blade rotates generally clockwise as indicated at 55, with the tooth path 59 of the blade 13 prescribing an oscillatory motion where the oscillatory motion traced by teeth 45 of the blade, while rotating, travels away from the central axis 35 to reach a maxima point 71 disposed away from the central axis 35 before travelling back toward the central axis 35 in a smooth curve, and from a minima 73, then tending smoothly to again travel away from the central axis 35 to reach a maxima point 71, and so on.

Figure 12:
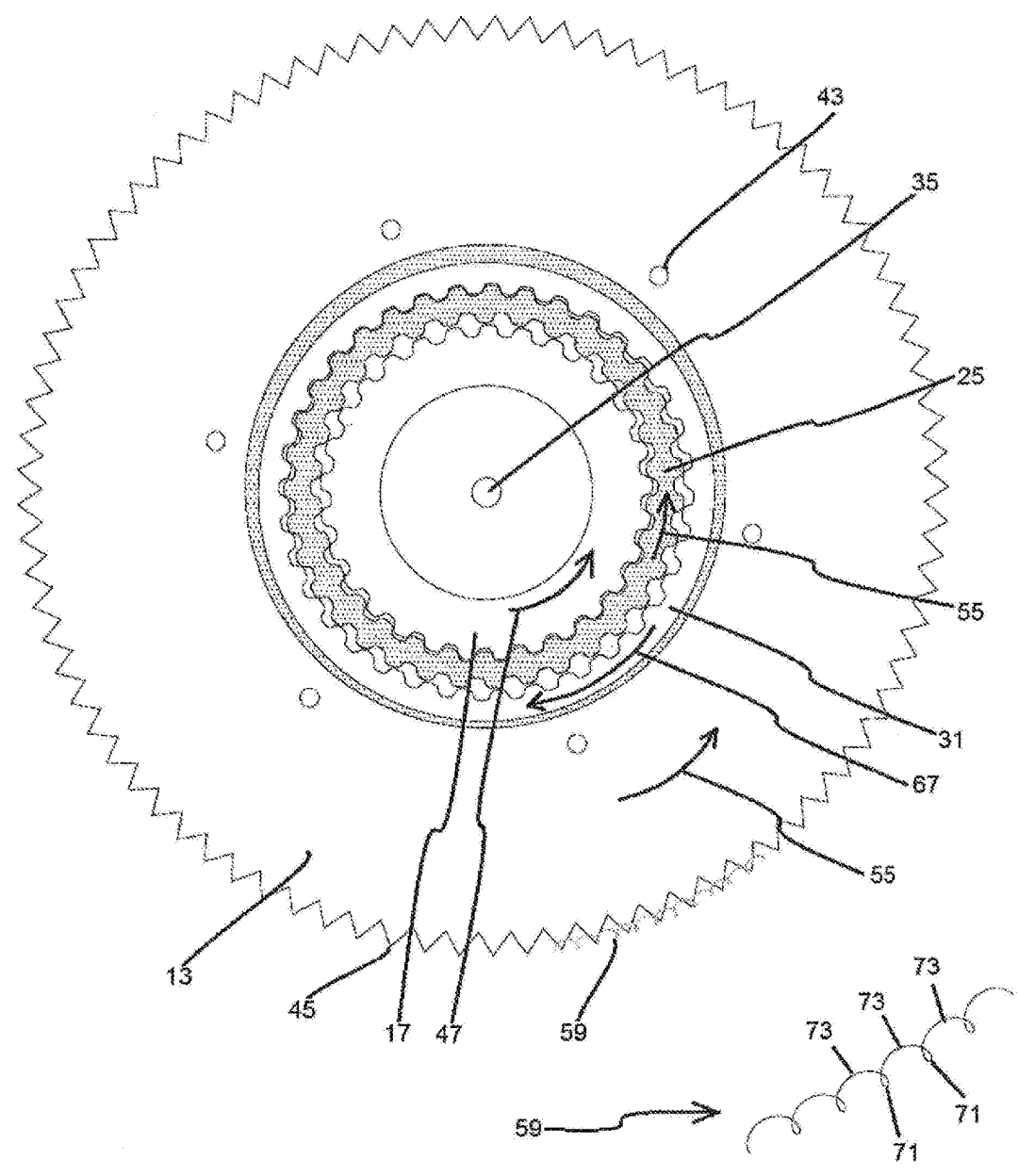

In FIG. 12, the path 59 is shown for the inner cog 17 of the mechanism being driven at −8 (anticlockwise) speed relative to the outer cog 31 driven speed of +4 (clockwise). The blade rotates generally clockwise as indicated at 55, with the tooth path 59 of the blade 13 prescribing an oscillatory motion where the motion traced by teeth 45 of the blade, while rotating, travels from a minima 73 away from the central axis 35 to reach a maxima point 71 disposed away from the central axis 35 before travelling back toward the central axis 35, and then tending smoothly to again travel away from the central axis 35 to reach a maxima point 71, and so on; however as the maxima point 71 is nearly reached, the blade travel direction reverses to anticlockwise, before reversing again to continue in a clockwise direction after the point has passed (ie the blade teeth 45 perform a reverse loop as the maxima point 71 is reached.

Figures 13, 13A:
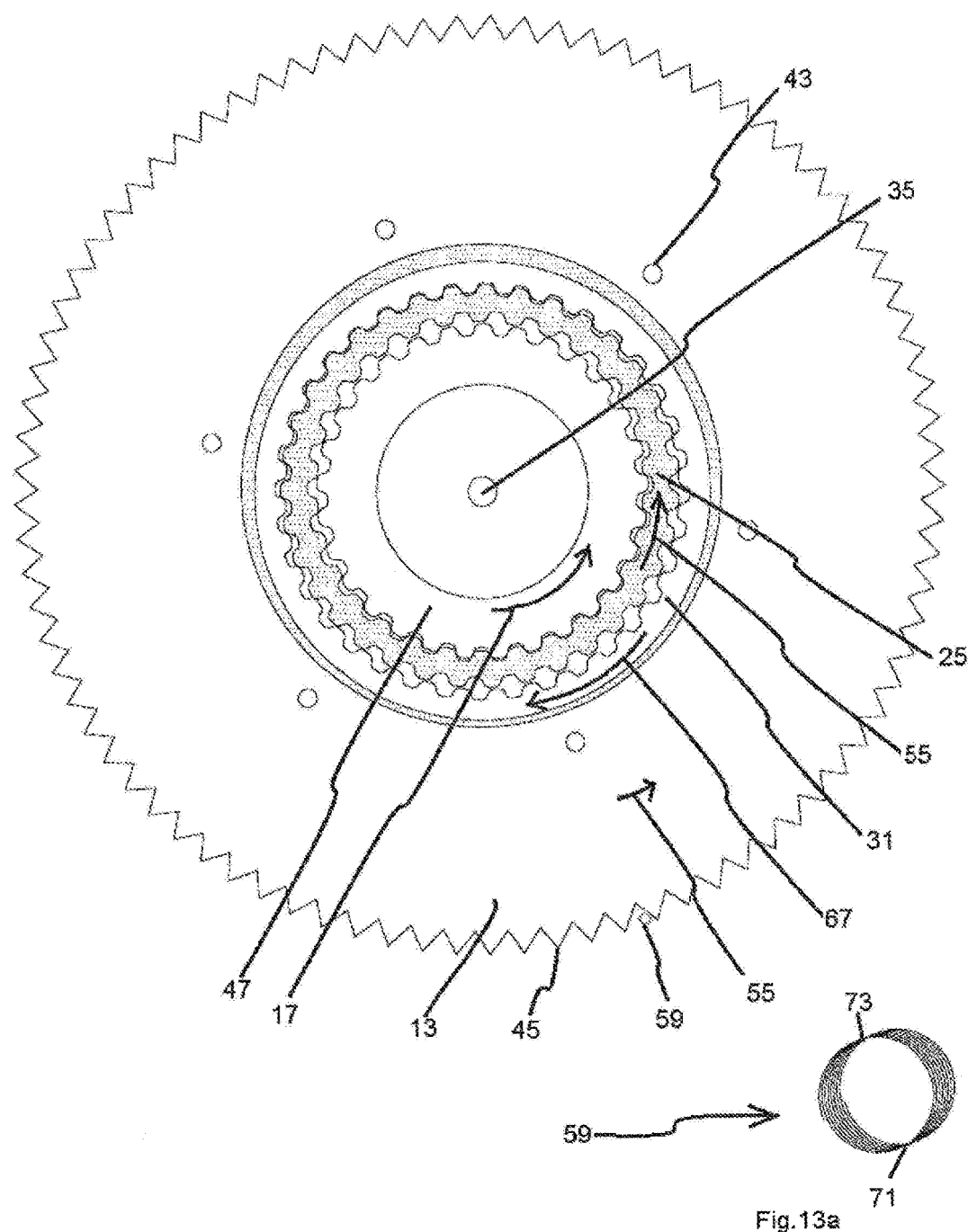

In FIG. 13, the path 59 is shown for the inner cog 17 of the mechanism being driven at −5 (anticlockwise) speed relative to the outer cog 31 driven speed of +4 (clockwise). The blade rotates very slowly, over all anticlockwise as indicated at 55, with the major motion being the tooth path 59 of the blade 13 prescribing an oscillatory motion where the motion traced by teeth 45 of the blade, while rotating, is generally circular. The trajectory of the teeth 41 when impacting material at the maxima point 71 is generally anticlockwise, reverting to clockwise at the top part of the stroke toward the minima position 73.

Figures 14, 14A:
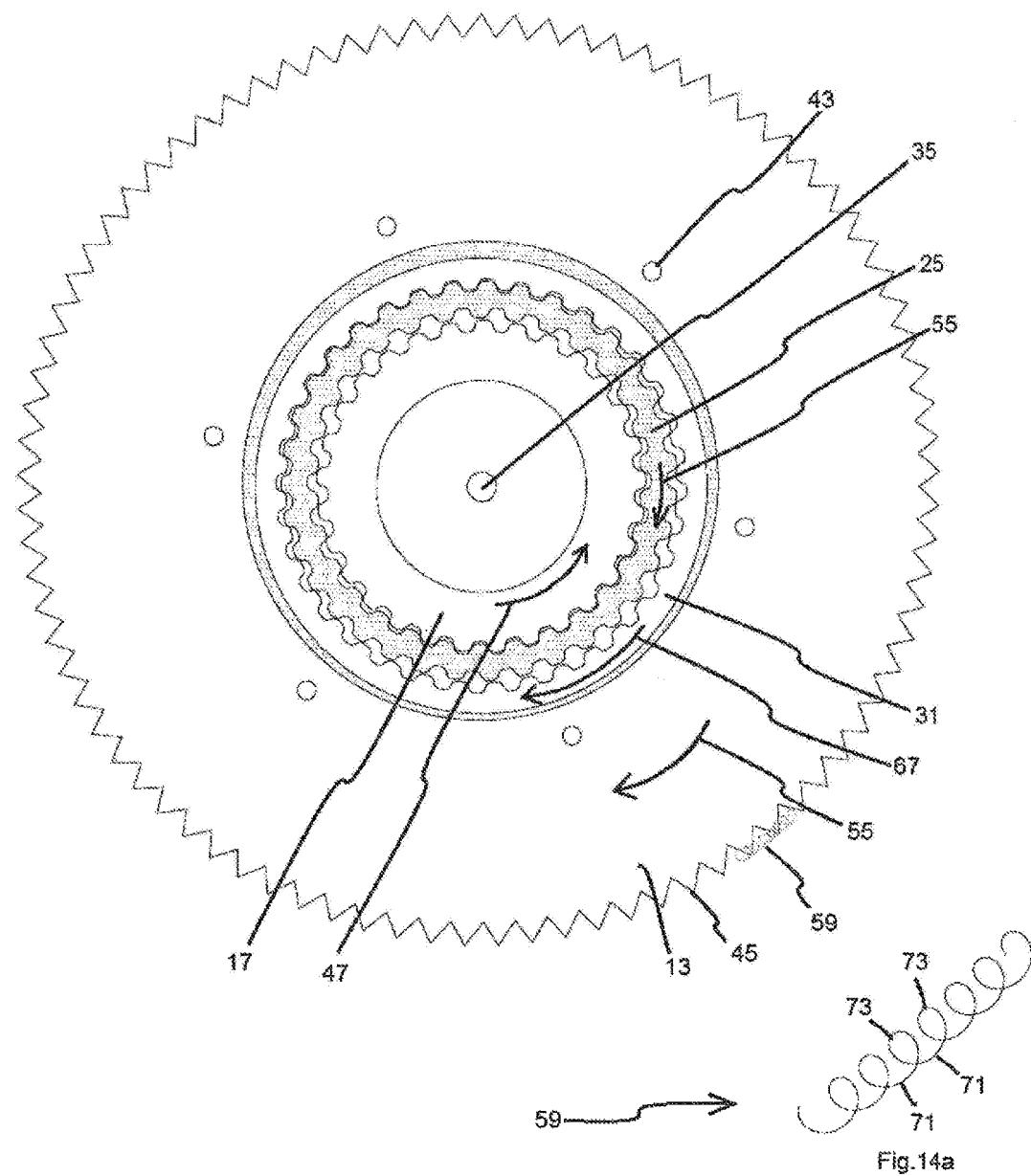

In FIG. 14, the path 59 is shown for the inner cog 17 of the mechanism being driven at −4 (anticlockwise) speed relative to the outer cog 31 driven speed of +4 (clockwise). The blade rotates slowly, over all clockwise as indicated at 55, with the motion of the tooth path 59 of the blade 13 prescribing an oscillatory motion where the oscillatory motion traced by teeth 45 of the blade, while rotating, is generally circular. The trajectory of the teeth 41 when impacting material toward the maxima point 71 is generally clockwise, reverting to anticlockwise at the top part of the stroke as the minima point 73 is approached.

Figures 15, 15A:
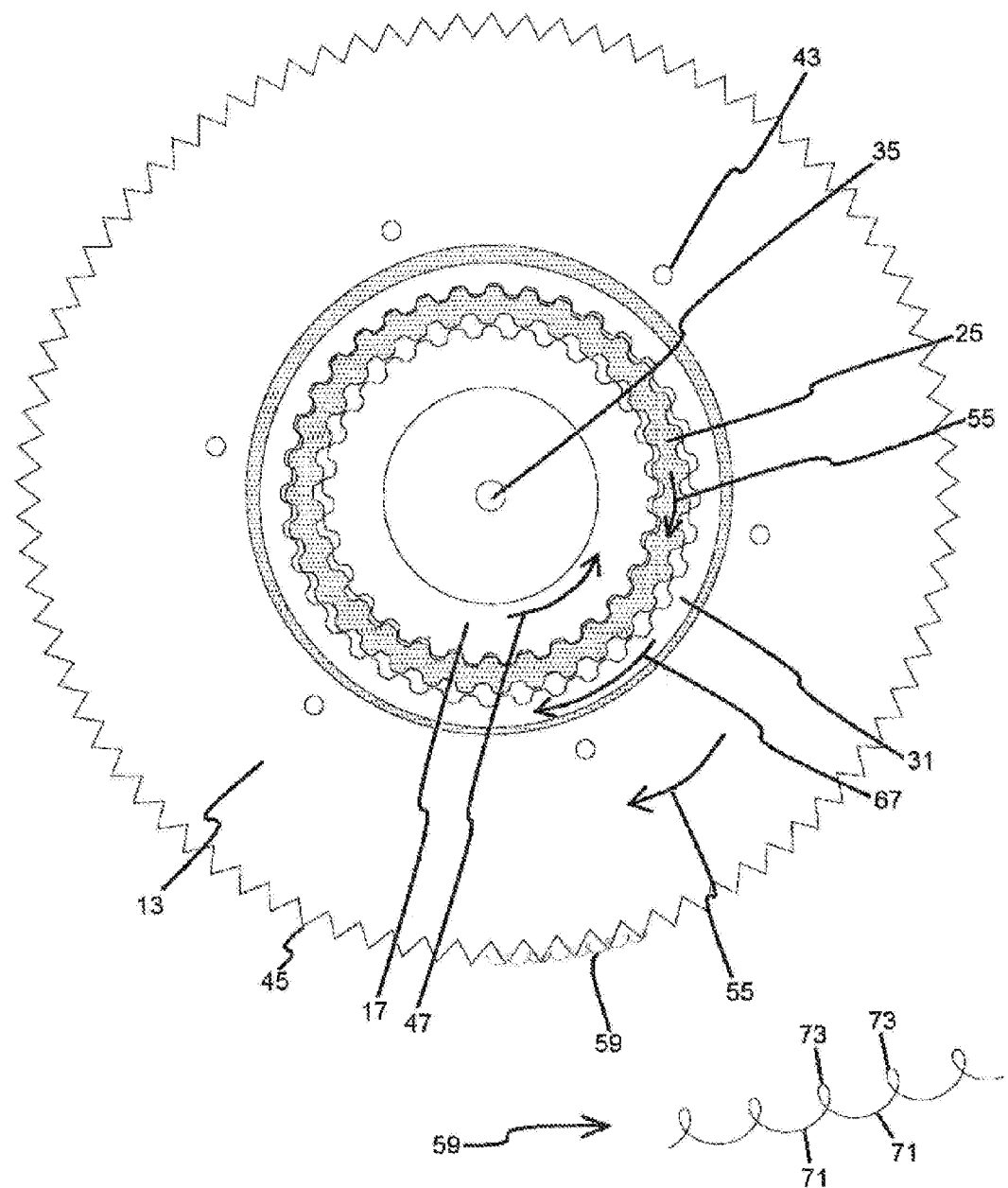

In FIG. 15, the path 59 is shown for the inner cog 17 of the mechanism being driven at −4 (anticlockwise) speed relative to the outer cog 31 driven speed of +5 (clockwise). The blade rotates slowly clockwise as indicated at 55, with the motion of the tooth path 59 of the blade 13 prescribing an oscillatory motion where the oscillatory motion traced by teeth 45 of the blade, while rotating, is generally circular. The trajectory of the teeth 41 when impacting material is generally clockwise, reverting only very briefly to anticlockwise at the top part of the stroke toward the minima point 73. Toward impact with material being cut, as the blade approaches the maxima point 71, the clockwise speed of the blade is faster than the speed when operated as shown in FIG. 14.

Figure 16:
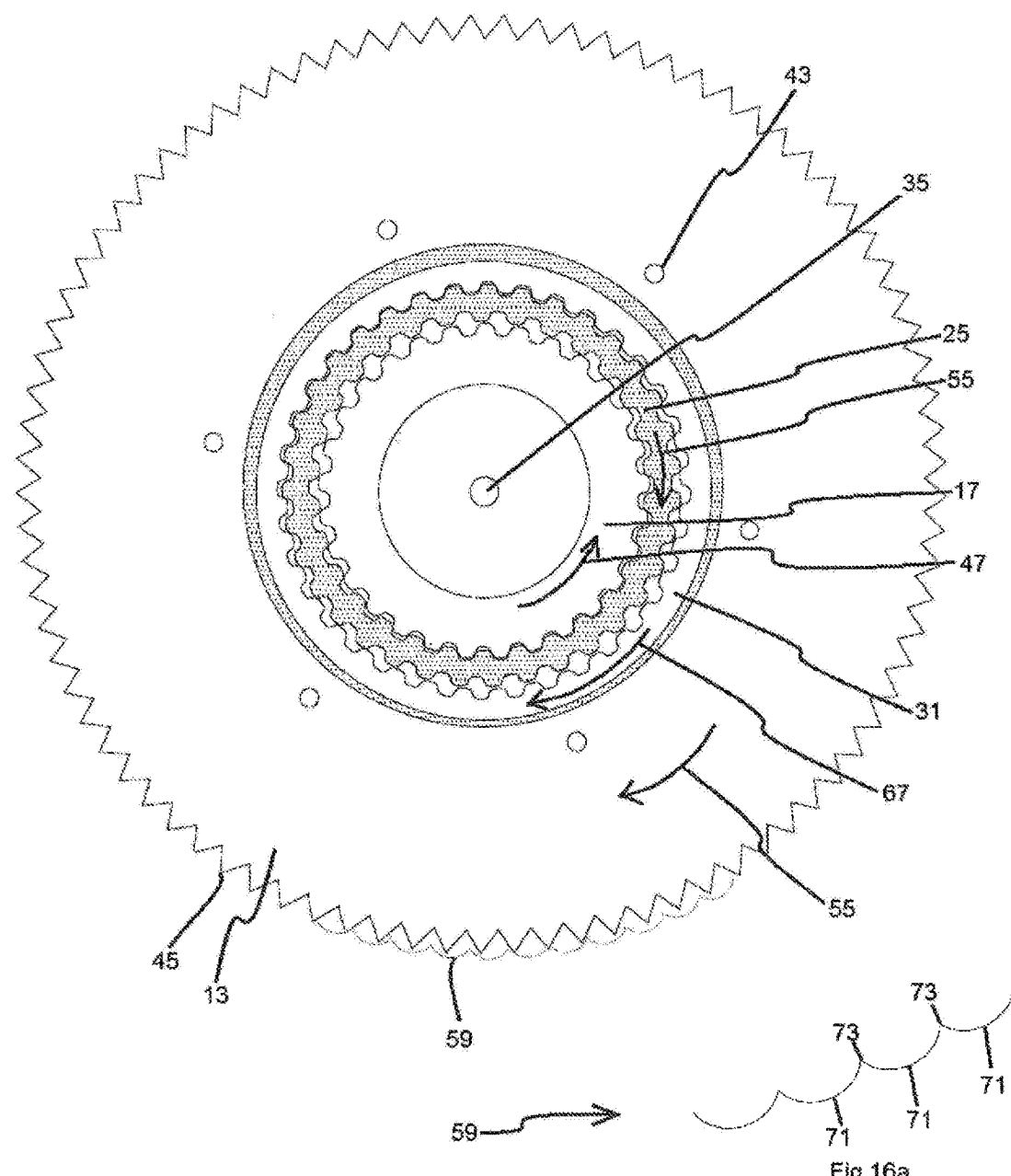

In FIG. 16, the path 59 is shown for the inner cog 17 of the mechanism being driven at −4 (anticlockwise) speed relative to the outer cog 31 driven speed of +8 (clockwise). The blade rotates clockwise as indicated at 55, with the motion of the tooth path 59 of the blade 13 prescribing an oscillatory motion opposite in nature to that shown in FIG. 11, where the oscillatory motion traced by teeth 45 of the blade, while rotating, is generally circular. The trajectory of the teeth 41 when impacting material is generally clockwise, slowing to a minima point 73 where the teeth are closest to the central axis 35, before moving away from the central axis after the point has been reached to reach a maxima point 71. Movement through the maxima point 71 is a smooth curve with maximum blade tip velocity occurring at the maxima point 71.

Figures 17, 17A:
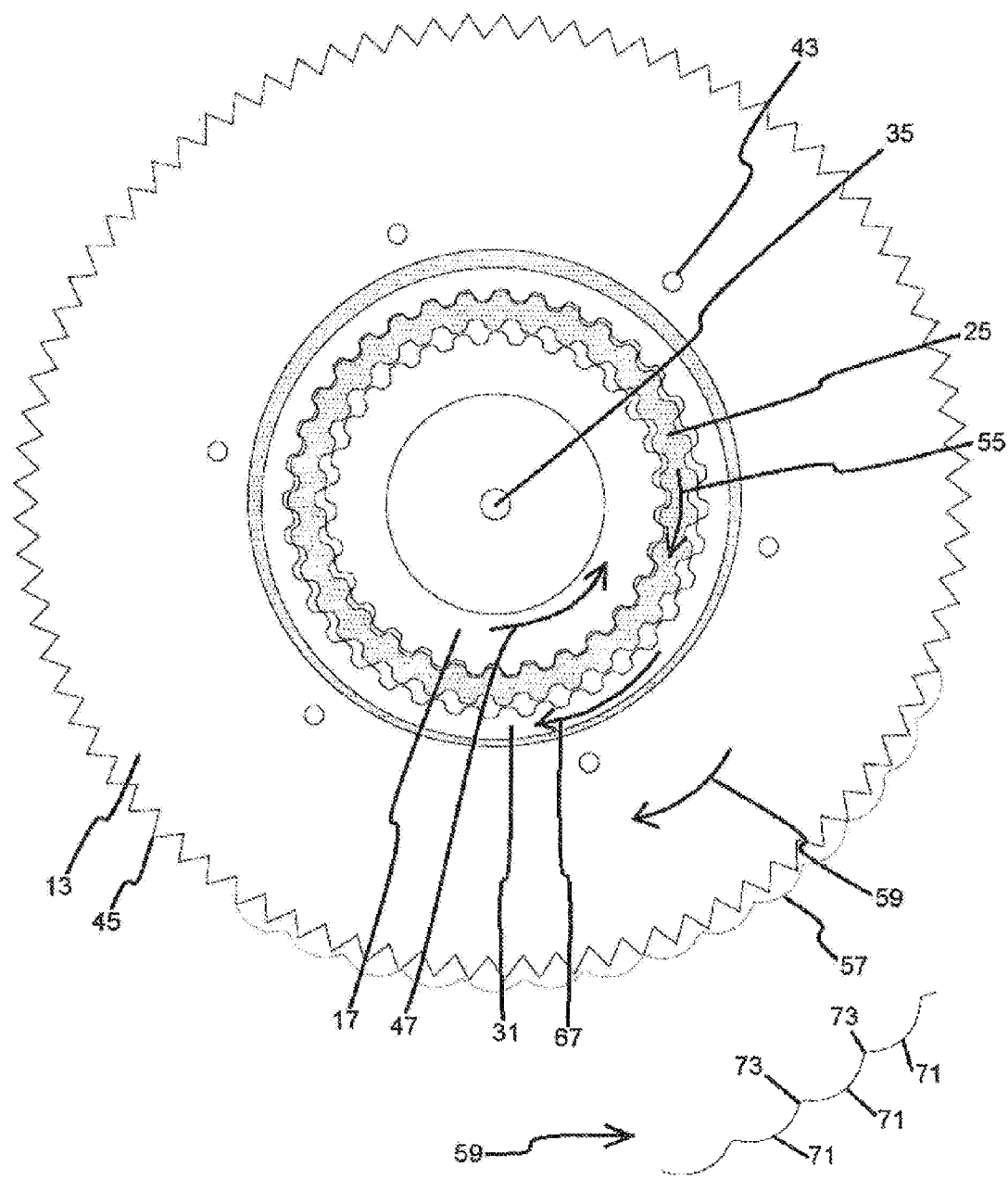

In FIG. 17, the path 59 is shown for the inner cog 17 of the mechanism being driven at −4 (anticlockwise) speed relative to the outer cog 31 driven speed of +14 (clockwise). The blade rotates clockwise as indicated at 55, with a greater velocity than with the operational parameters shown in FIG. 16. The motion of the tooth path 59 of the blade 13 prescribes an oscillatory motion similar to that shown in FIG. 16, where the oscillatory motion traced by teeth 45 of the blade, while rotating, is generally circular. The trajectory of the teeth 41 when impacting material toward the maxima point 71 is generally clockwise, slowing to a region toward the minima point 73 where the teeth are closest to the central axis 35 but continuing to move in a clockwise direction, before moving away from the central axis after the minima point 73 has been reached.

The blade of the first, second and third embodiments has a diameter of about 400 mm, and the input shaft speed can typically range from 100 RPM (revolutions per minute) up to the low thousands RPM. A variable speed motor, such as a triac or equivalent controlled electric motor can be used, with the ability to adjust the input shaft speed being used in practice by an operator to find a natural resonance at which the cutting action can be optimised.

The rotation of the input shaft translates to an orbital/oscillatory action at many times the frequency of the input shaft rotation. The ratio between the input shaft angular velocity and the orbital/oscillatory frequency is determined by the number of teeth in the meshing cogs. The throw of the blade is a function of tooth pitch and height and permissible eccentric movement of the floating cog.

It will be understood that as the blade diameter increases, the required input shaft speed would fall. A very large diameter blade of a few meters with a larger mechanism, may require an input shaft speed of only a few RPM to low tens RPM, for effective rock cutting. Similarly as the blade diameter drops and the mechanism size reduces, the input shaft speed can increase into the higher thousands RPM to tens of thousands RPM.

Figure 18:
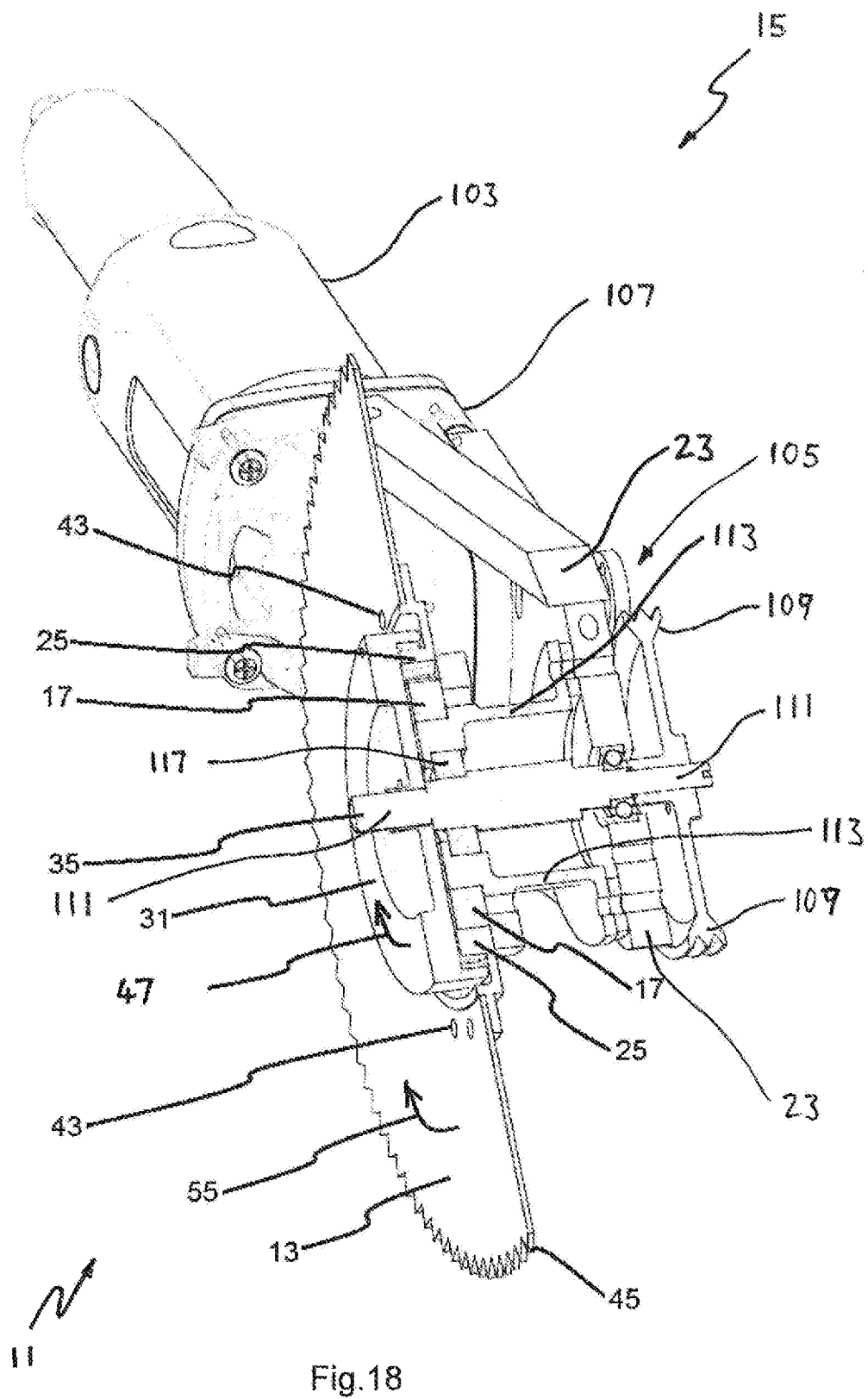
FIG. 18 is an isometric view of an embodiment of a completed cutting, abrading or grinding tool, using the mechanism of the first embodiment.

Referring to FIG. 18, a cutting tool 15 incorporating the mechanism 11 of the first embodiment is shown. The cutting tool 15 has an electric motor 103 controlled by a user operable switch (not shown), connected with a drive pulley 105 via a bevel gear set housed within a gearbox housing 107. The drive pulley 105 drives a larger diameter driven pulley 109 via a belt, the drive pulley 105, and larger diameter driven pulley 109 forming a reduction drive so that the driven pulley 109 rotates at a lower rotational speed than the drive pulley 105. The driven pulley 109 is connected for rotation to rotate an input coupling 111 located along the central axial extent 35 of the mechanism 11. In FIG. 18 the mechanism 11, input coupling 111 and driven pulley 109 and circular blade 13 are shown in cross-section, through the central axial extent 35 of the mechanism 11.

The chassis 23 of the tool 15 is rigidly connected with the gearbox housing 107, and a hub 113 is provided extending from the chassis 23 to provide an anchoring point on which the inner cog 17 is fixed, secured against rotation. The input coupling 111 is mounted adjacent to the driven pulley 109 on a ball bearing race 115 and to the hub 113 via a bush 117, to allow rotation of the input coupling 111 relative to the hub 113. The outer cog 31 is secured for rotation to the input coupling 111, and rotates in the direction indicated by the arrow 47.

On operation of the tool 15, the blade 13 is caused to move in an orbital, oscillatory or impact motion, which is particularly effective for cutting concrete and stone. The cutting action results in cuttings in the form of a powder which drop out of the cut, under gravity, and do not become airborne.

Figure 19:
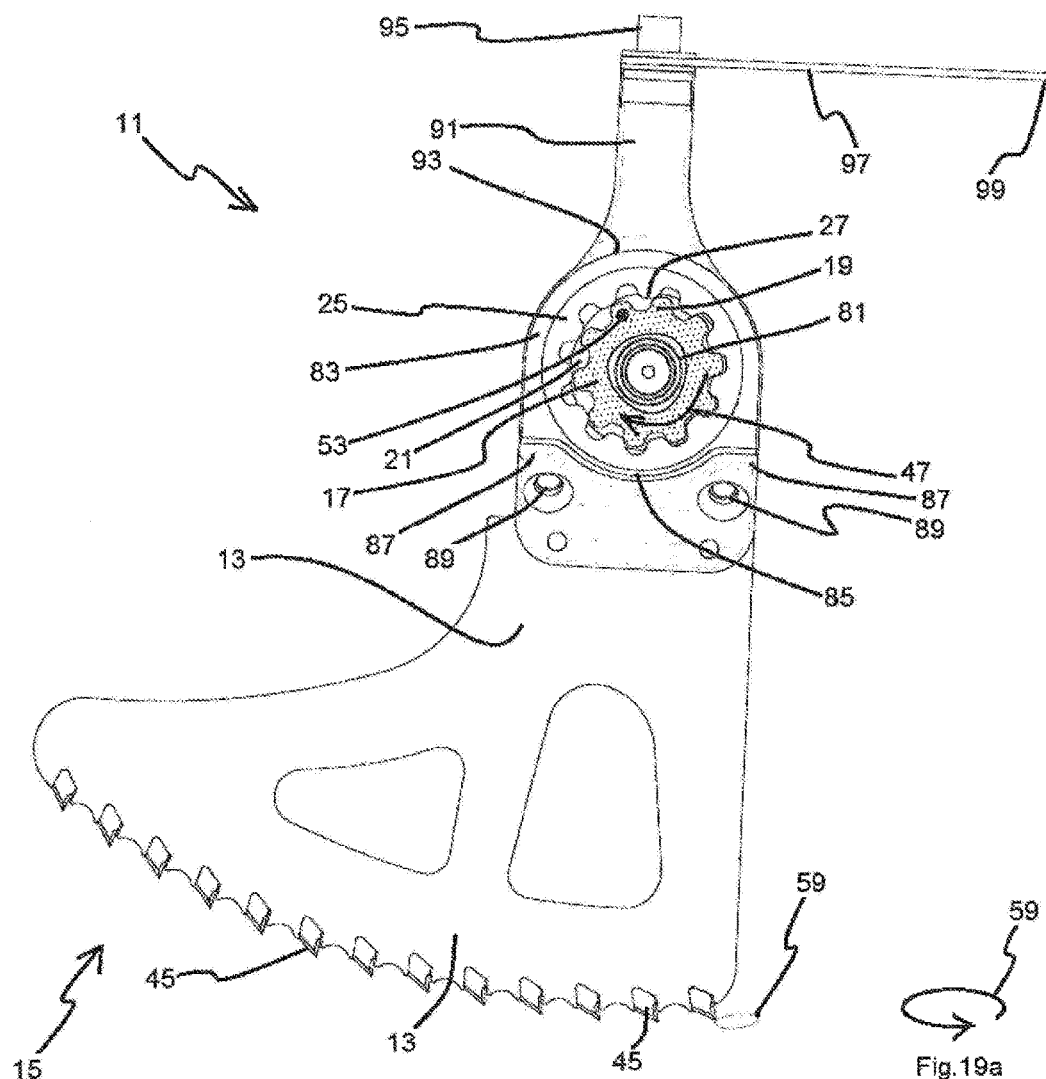
FIGS. 19 and 20 is a side view of a mechanism and blade assembly for a cutting, abrading or grinding tool, in a fourth embodiment.
Figure 20:
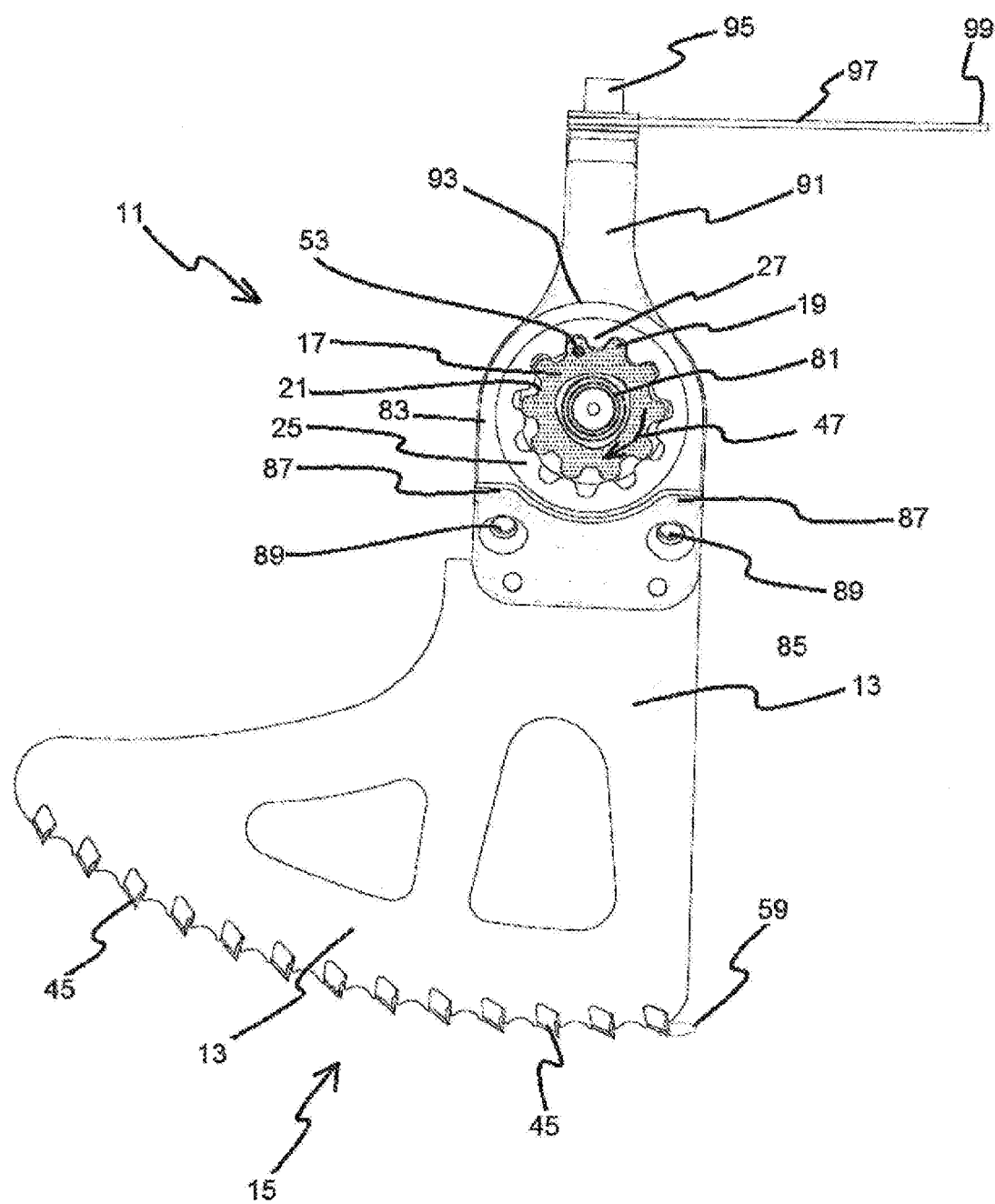

The fourth embodiment is illustrated in FIGS. 19, 19*a*, and 20, and is a cutting tool 15 that can be used for cutting concrete. FIGS. 19 and 20 show part of a sequence through one cycle of orbital motion transmitted to the blade. The cutting tool incorporates a mechanism 11 according to the invention, comprising an inner circular part in the form of an inner cog 17 having teeth members in the form of teeth 19 which extend radially outwardly from the circumferential surface 21 of the inner cog 17. The teeth 19 comprise ridges with intervening troughs extending along and spaced from the central axis of the inner cog 17, the shape of the teeth (ridges and troughs) being roughly sinusoidal. In use, in this fourth embodiment, the inner cog 17 is fixed to an input coupling 81 which when powered by a motor, rotates the inner cog 17 in the direction indicated at 47.

The mechanism 11 has a surrounding circular part in the form of a floating cog 25 having inner teeth members in the form of inwardly extending teeth 27 that extend radially inwardly to mate interferingly with coincident teeth 19. The teeth 27 comprise ridges with intervening troughs that extend in an axial direction spaced from the central axis of the floating cog 25, and have a shape that is roughly sinusoidal.

The floating cog 25 is surrounded by a housing 83, which is rigidly affixed thereto. On the bottom 85 of the housing 83, there is provided an output coupling 87 extending downwardly including mounting points 89 to mount a single arcuate blade 13 having a leading heal and a trailing toe. A leg 91 extends from the top 93 of the housing 83, up to a mounting point 95 by which the leg 91 is secured by a resilient member such as a spring steel strip element 97 which is secured at its opposite end 99 to a chassis of the tool 15 common to the chassis to which the motor for the tool is secured and the input coupling 81 is secured for rotation.

The securing of the top of the leg 91 provides a pivot point, which results in the input cog 17 imparting a complex cam action in the floating cog 25. By virtue of this arrangement, the teeth 45 of the blade 13 orbit through an elliptical pathway 59 at a relatively high frequency when compared with the rotational speed of the input coupling 81 and inner cog 17. The tooth motion path is shown at 59 and comprises, as viewed in the drawing, an anti-clockwise path with the teeth 45 excavating as the blade 13 moves in a direction toward the heel.

The effect of the pivot point formed by securing the top of the leg 91, imparting the complex cam action in the floating cog 25, is to confine the useful cutting action of the blade to an arc having a maximum extent of from 60° to about 70°, located roughly opposite the mechanism 11 from the pivot point. As a result of this, the blade need not be a full circular blade as in the preceding embodiments; it need be only a sector, saving in blade fabrication cost. Having said this there may be circumstances where a full circular blade is required with such a mechanism, and such is described later with reference to the seventh embodiment shown in FIG. 32.

Figures 21, 21A:
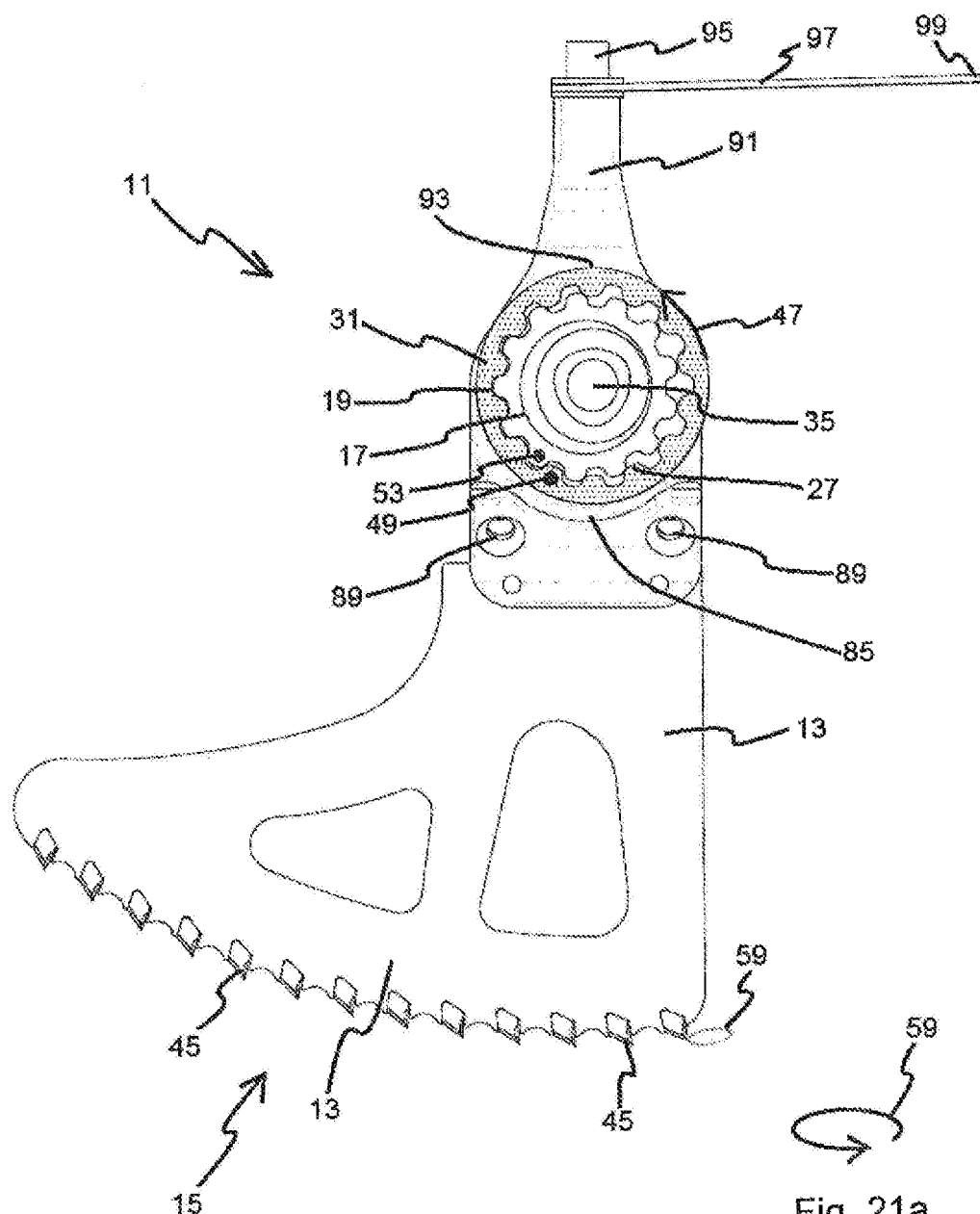
FIGS. 21 to 23 is a side view of a mechanism and blade assembly for a cutting, abrading or grinding tool, in a fifth embodiment.
FIG. 21a illustrates the blade tip trajectory for the bottom of the blade in the fifth embodiment.
Figure 22:
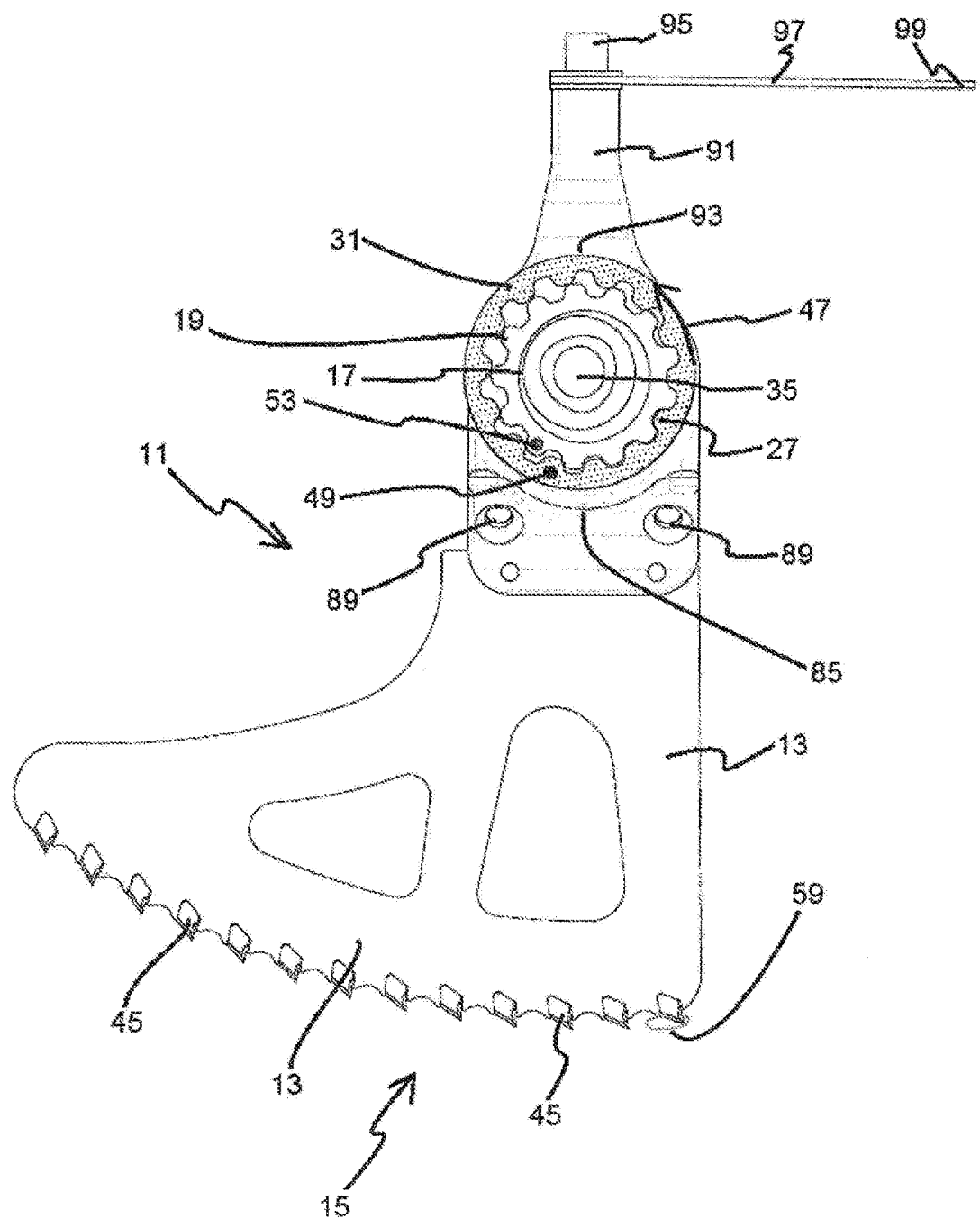
Figure 23:
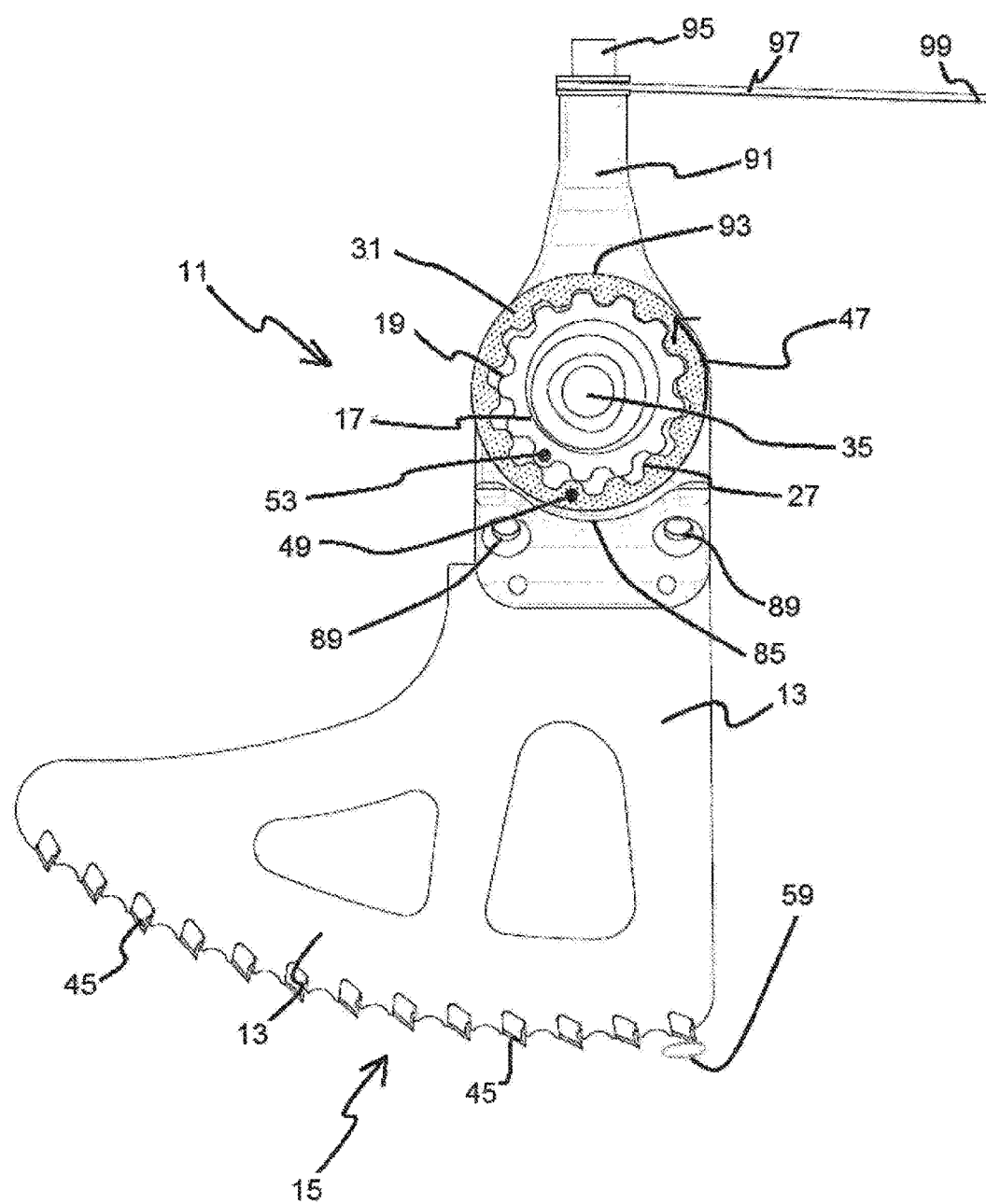

The fifth embodiment is illustrated in FIGS. 21, 21*a*, 22 and 23. FIGS. 21, 22 and 23 show a sequence through one cycle of orbital motion transmitted to the blade. The fifth embodiment differs from the fourth embodiment in that it is the outer cog that is rotated while the inner cog is connected to output the rotary orbital motion to the blade 13. The cutting tool 15 of the fifth embodiment incorporates a mechanism 11 according to the invention, comprising an inner circular part in the form of an inner cog 17 having teeth members in the form of teeth 19 which extend radially outwardly from the circumferential surface 21 of the inner cog 17. The teeth 19 comprise ridges with intervening troughs extending along and spaced from the central axis of the inner cog 17, the shape of the teeth (ridges and troughs) being roughly sinusoidal.

The mechanism 11 has a surrounding circular part in the form of an outer cog 31 having inner teeth members in the form of inwardly extending teeth 27 that extend radially inwardly to mate interferingly with coincident teeth 19. The teeth 27 comprise ridges with intervening troughs that extend in an axial direction spaced from the central axis of the outer cog 31, and have a shape that is roughly sinusoidal.

The outer cog 31 in this fifth embodiment is fixed to an input coupling 81 which when powered by a motor, rotates the outer cog 31 in the direction indicated at 47.

The inner cog 17 is rigidly fixed to and surrounded by a housing 83. On the bottom 85 of the housing 83, there is provided an output coupling 87 extending downwardly including mounting points 89 to mount a single arcuate blade 13. A leg 91 extends from the top 93 of the housing 83, up to a mounting point 95 by which the leg 91 is secured by a resilient member such as a spring steel element 97 which is secured at its opposite end 99 to a chassis of the tool 15 common to the chassis to which the motor for the tool is secured and the input coupling 81 is secured for rotation.

The securing of the top of the leg 91 provides a pivot point, which results in the input cog 17 imparting a complex cam action in the floating cog 25. By virtue of this arrangement, the teeth 45 of the blade 13 orbit through an elliptical pathway 59 at a relatively high frequency when compared with the rotational speed of the input coupling 81 and inner cog 17.

Figure 24:
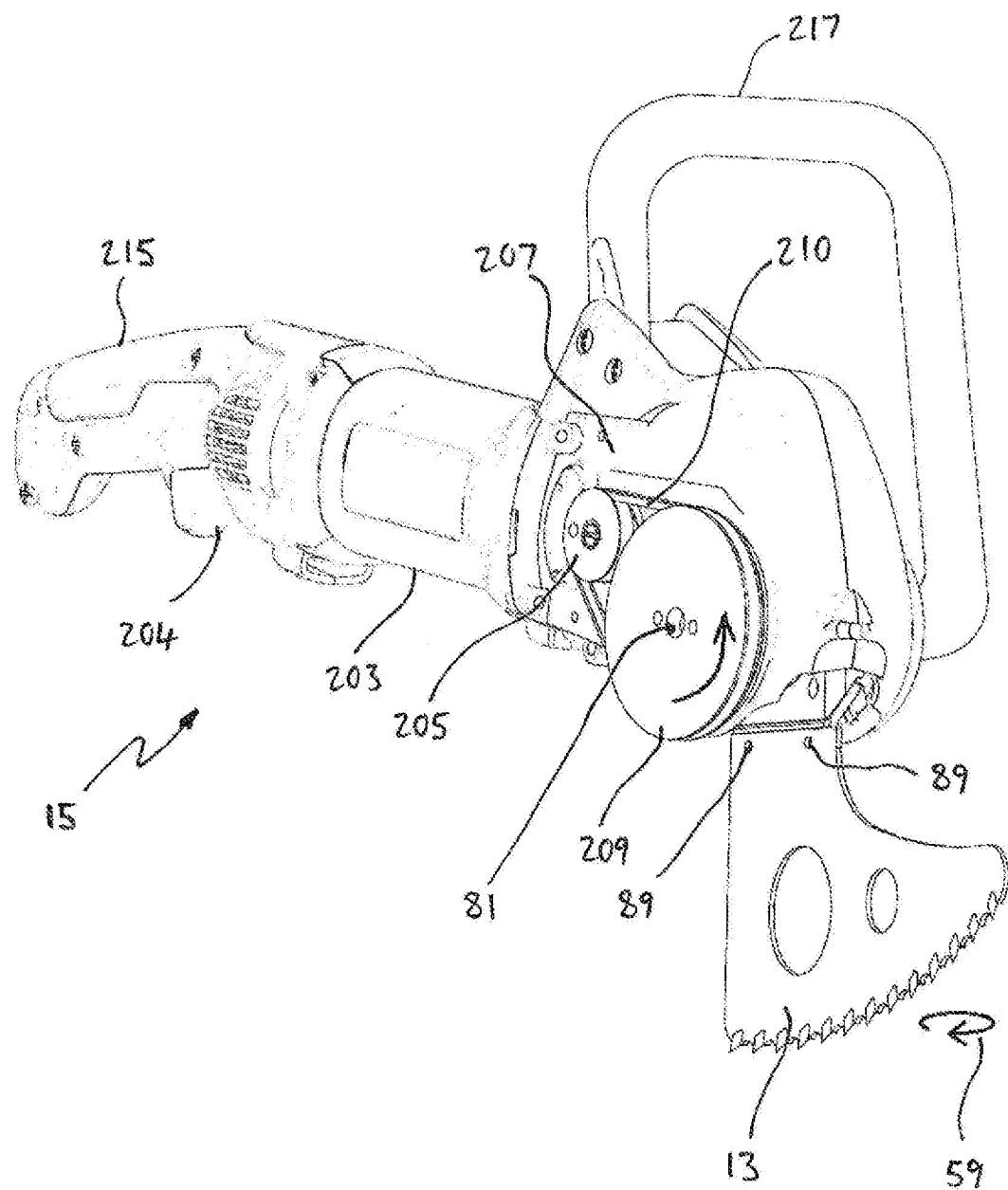
FIG. 24 is an isometric view of an embodiment of a completed cutting, abrading or grinding tool, using the mechanism of the fourth embodiment.
Figure 25:
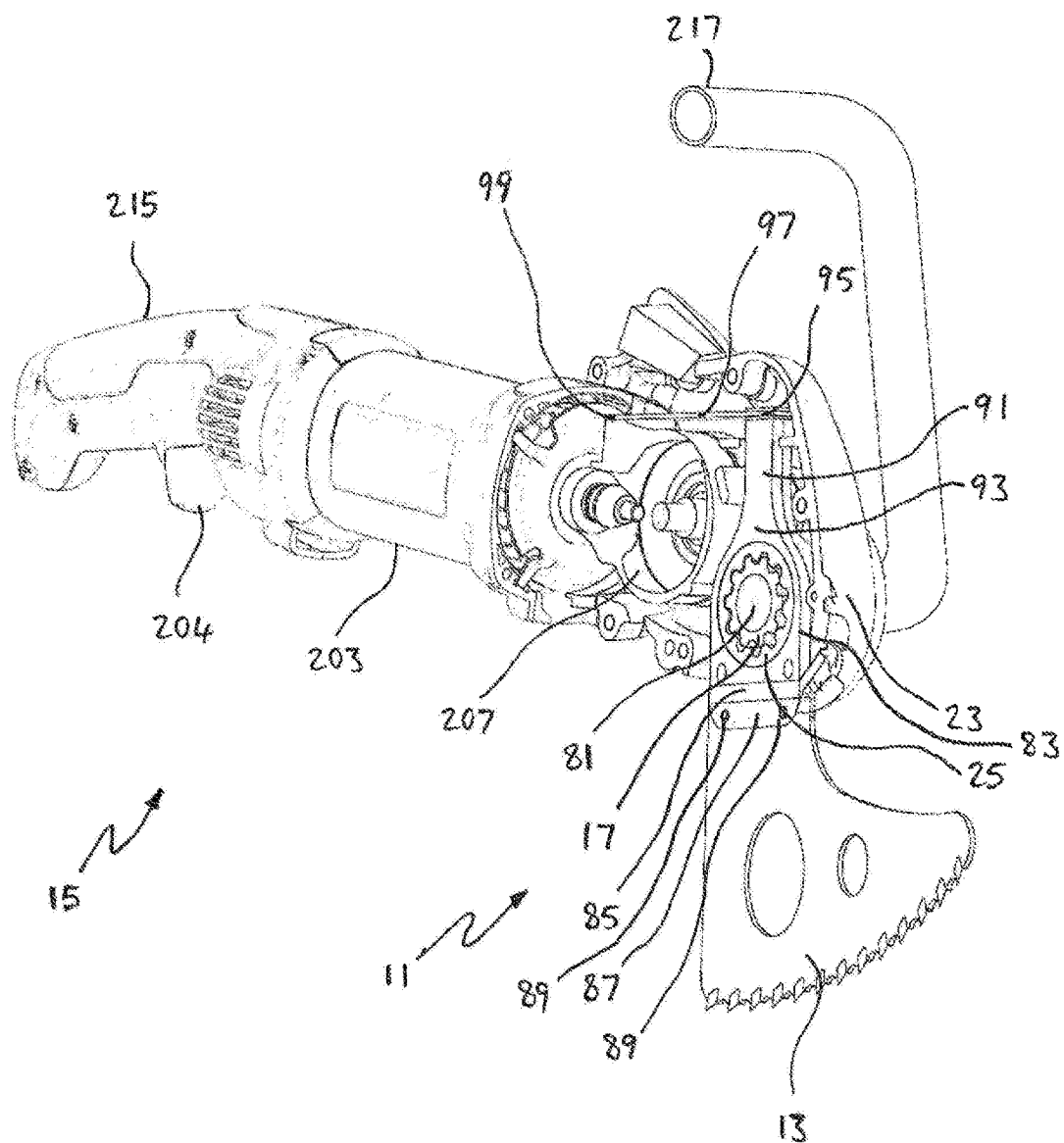
FIG. 25 is an isometric view of the tool of FIG. 24 showing it partially dismantled.

Referring to FIGS. 24 and 25, a cutting tool 15 incorporating a mechanism 11 similar to that of the fourth embodiment is shown. The cutting tool 15 has an electric motor 203 controlled by a user operable switch 204, connected with a drive pulley 205 via a bevel gear set housed within a gearbox housing 207. The drive pulley 205 drives a larger diameter driven pulley 209 via a belt 210, the drive pulley 205, and larger diameter driven pulley 209 forming a reduction drive so that the driven pulley 209 rotates at a lower rotational speed than the drive pulley 205. The driven pulley 209 is connected for rotation to rotate the input coupling 81 located along the central axial extent of the mechanism 11.

The chassis 23 of the tool 15 is rigidly connected with the gearbox housing 207, and provides bearing mounts to mount the input coupling shaft 81 to be driven by the pulley 209. Rotation of the input coupling shaft 81 rotates the inner cog 17. As described above, the floating cog 25 is surrounded by a housing 83, which is rigidly affixed thereto. On the bottom 85 of the housing 83, there is provided an output coupling 87 extending downwardly including mounting points 89 to mount a blade 13. A leg 91 extends from the top 93 of the housing 83, up to a mounting point 95 by which the leg 91 is secured by a resilient member such as a spring steel element 97 which is secured at its opposite end 99 to the chassis 23 of the tool 15 (common to the chassis to which the motor for the tool is secured and the input coupling 81 is secured for rotation).

The securing of the top of the leg 91 provides a pivot point, which results in the input cog 17 imparting a complex cam action in the floating cog 25. By virtue of this arrangement, the teeth 45 of the blade 13 orbit through an elliptical pathway 59 at a relatively high frequency when compared with the rotational speed of the input coupling 81 and inner cog 17.

In use, the tool is grasped in one hand about a handle 215 located rearward of the motor 203 and switch 204, so that the switch 204 can be operated by the index finger of the hand grasping the handle 215; and grasped in the other hand by an overhead handle 217. The handles 215 and 217 are located so that the tool centre of gravity is located in the same plane as the blade 13, and the grasping of the tool does not shift the centre of gravity unduly.

On operation of the tool 15, the blade 13 is caused to move in an orbital, oscillatory or impact motion, which is particularly effective for cutting concrete and stone. The cutting action results in cuttings in the form of a powder which drop out of the cut, under gravity, and do not become airborne. This embodiment of the tool is more compact than that shown in FIG. 18.

The tool shown in FIGS. 24 and 25, utilising the mechanism of the same configuration as the fourth embodiment, provides a cutting device in which the motion of the cutting teeth are similar to that of the applicant's earlier patent U.S. Pat. No. 5,456,011, but is capable of cutting much harder materials such as concrete. This was not possible with the arrangement described in U.S. Pat. No. 5,456,011. In addition, the arrangement described in U.S. Pat. No. 5,456,011 required two blades mounted side by side, since the blades acted synergistically, whereas this invention will work even more effectively than the earlier arrangement with just one blade. The tool shown in FIGS. 24 and 25, utilising the mechanism of the same configuration as the fourth embodiment, is capable of working at a much higher frequency and overcomes the high heat and fatigue problems which were found to be limitations of the arrangement described in U.S. Pat. No. 5,456,011.

As can be seen in the drawings, in the embodiment shown in FIGS. 24 and 25, the tool effectively comprises an internally geared 25 conrod 91, 87 which is driven internally by a rotating cog 17 (externally toothed) mounted on a fixed axis formed by the input coupling shaft 81. There is a difference in tooth count in the rotating cog 17 of at least one tooth less than the internal gear of the conrod (in this embodiment the tooth count difference is one). The top end of the conrod 95 is connected to a spring 97 or pivot mechanism such that the top of the conrod is restrained to be allowed to move primarily in an up down motion while the geared portion of the conrod is forced to move in an orbital motion by the rotation of the internal cog 17. The orbital motion of the conrod is in the opposite direction of the rotation of the internal cog 17. The blade 13 fixed at the other end of the conrod extending away from the pivot connection at the top end 95 of the conrod results in the teeth at the end of the blade 13 prescribing an elliptical motion, also in the opposite direction of the rotating drive gear.

The relative axis of the elliptical motion are dictated by the relative tooth sizes of the conrod gear and the internal cog 17 (short axis); and the ratio of the distance between the pivot mounting 95 to the internal cog 17 and the distance from the internal cog 17 to the end of the blade 13 (long axis); i.e the longer the blade is relative to the length of the conrod, the longer the elliptical movement of the teeth.

A benefit of this configuration is that a relatively slow rotation of the driven cog 17 results in a fast orbital rotation of the conrod and blade. If for instance the drive gear has 10 teeth and the conrod has 11, then for each single rotation of the drive gear, the conrod is forced to orbit 10 times in the opposite direction. A problem with the arrangement described in U.S. Pat. No. 5,456,011 was that the drive mechanism was required to rotate at the same rpm as the orbital motion and the resultant forces quickly become too much for the bearings thus limiting the frequencies necessary for cutting harder materials. In the present invention, the bearings supporting the drive gear rotate relatively slowly and there are no bearings involved in the high frequency orbital motion of the conrod and blade.

In both the present invention and the arrangement described in U.S. Pat. No. 5,456,011, the elliptical path the teeth take cause a combination of percussion (as the teeth strike the material being cut) and an excavation motion as the teeth progress to the end of the ellipse before lifting away from the material and travelling to the front of the ellipse and beginning again.

In the arrangement described in U.S. Pat. No. 5,456,011, the force of the teeth striking the material travel back along the blade and are largely passed directly through the bearings supporting the offset cam. These percussive forces can easily damage bearings especially if they are spinning at high speed and temperature. This is the prime reason the arrangement described in U.S. Pat. No. 5,456,011 being limited to cutting softer brick or masonry, and cannot be used to cut harder materials such as concrete.

The orbital motion of the current invention is produced not by an offset cam but rather by the relationship of the external and internal gear arrangement described above. In this arrangement it will be noted that because of the very close ratio, many teeth are engaged at the same time and this results in a very strong transfer of forces and these forces act concentric to the bearings not radially through them. Also, the bearings supporting the drive gear are driven at a far lower rpm hence there is significantly less damage, if any at all, sustained during operation.

Figure 26:
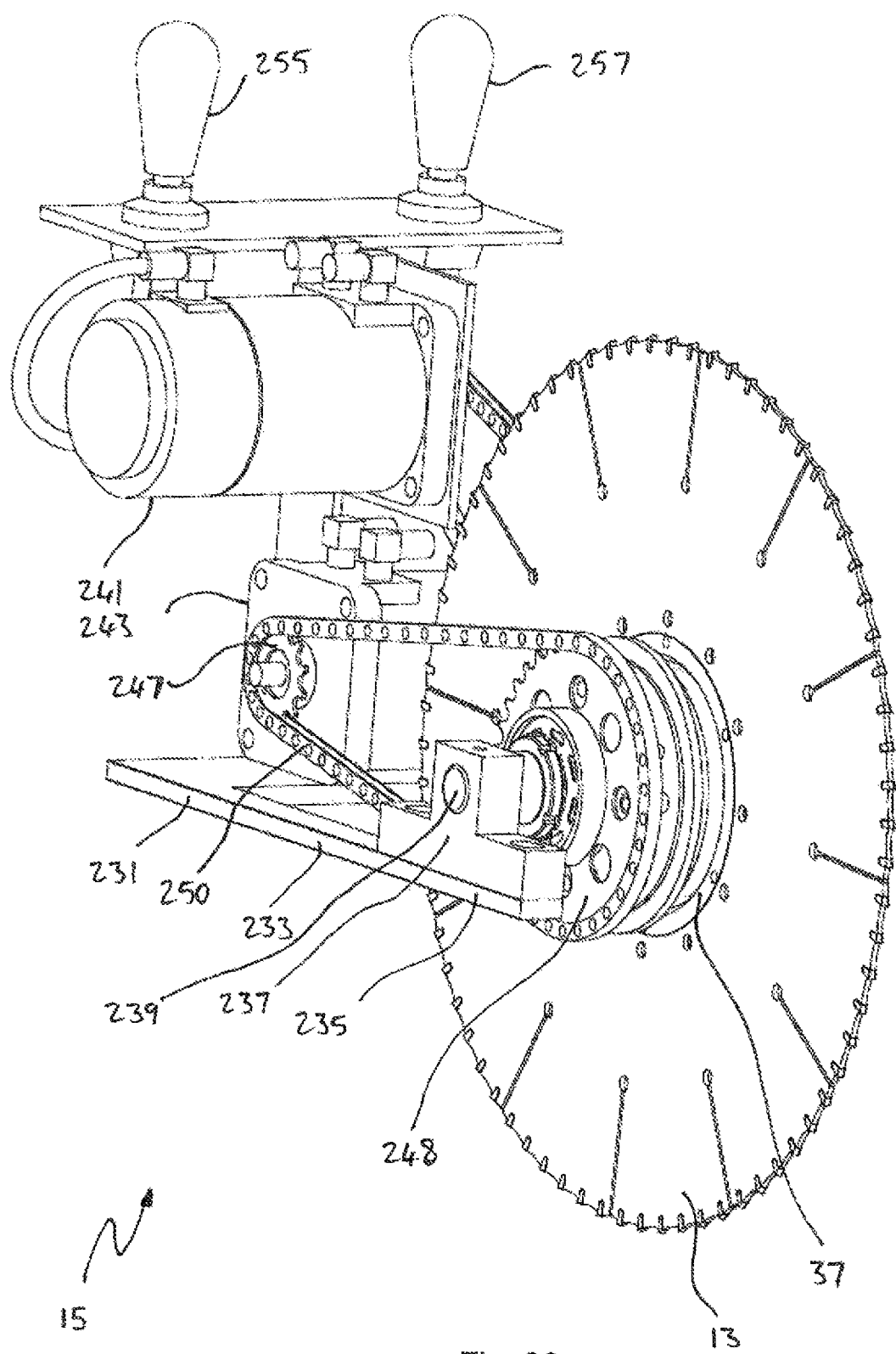
FIG. 26 is a right side perspective view of part of a tool using the mechanism of the third embodiment.
Figure 27:
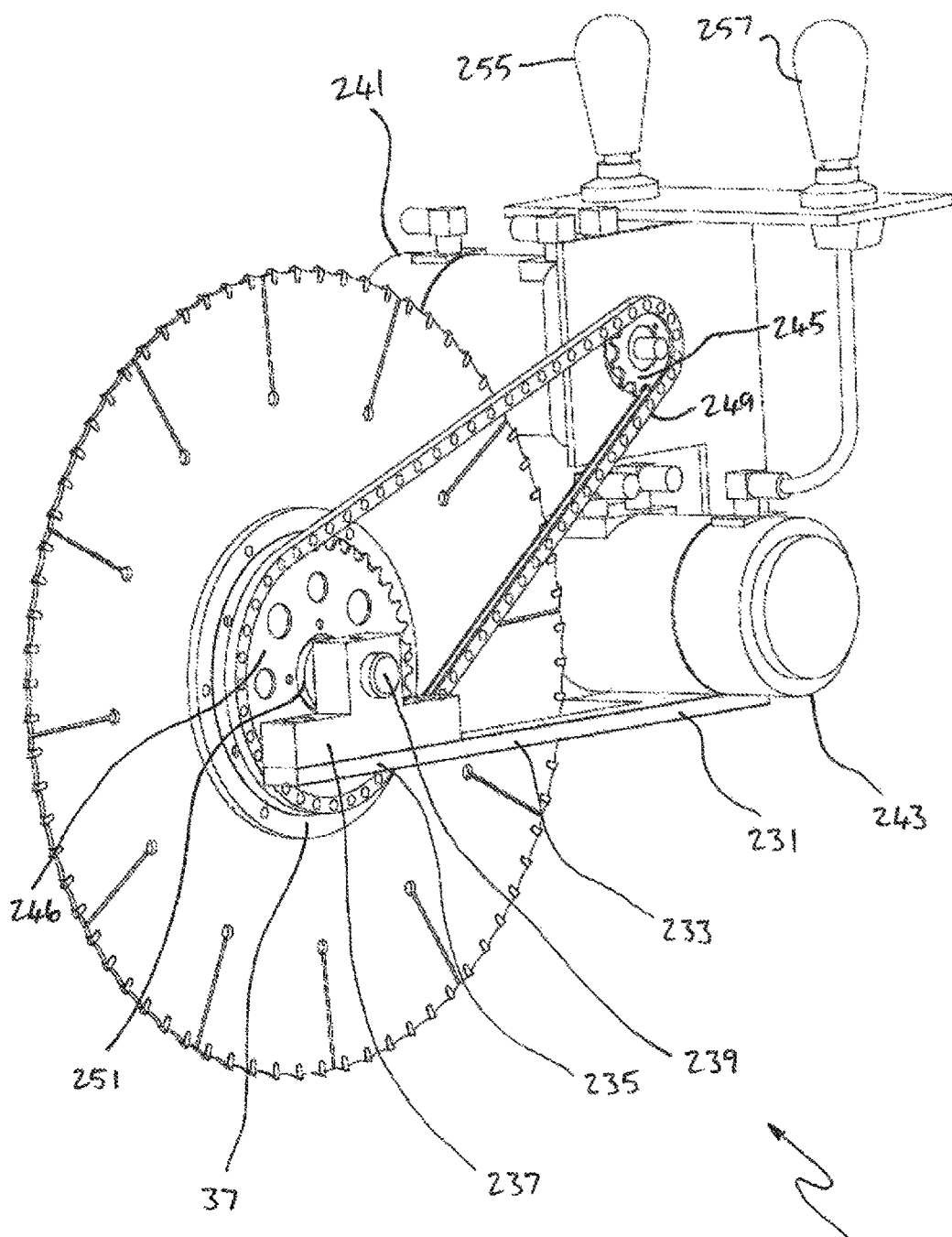
FIG. 27 is a left side perspective view of the part of the tool of FIG. 26.

While two of the specific tools made according to the embodiments are hand operated hand held tools, it is envisaged that the invention can be scaled up to large sized hydraulically operated machines that can be used in rock cutting operations in mining and civil engineering, with significant occupational health and safety benefits including reduced dust in the work environment. An example of such a tool is illustrated in FIGS. 26 and 27. The tool 15 illustrated in FIGS. 26 and 27 has a chassis plate 231 of forked construction having two arms 233, on the ends 235 of each being mounted a bearing block 237 which supports an axle 239. Also mounted off the chassis 231 are two hydraulic motors 241 and 243 which connect to the mechanism 11 each via a sprocket 245 246 247 248 and chain 249 250 reduction drive. Hydraulic motor 241 drives input coupling 251 via sprockets 245 and 246 and chain 249 to drive the inner cog 17. Hydraulic motor 243 drives input coupling 253 via sprockets 247 and 248 and chain 250 to drive the outer cog 31. Both motors 241 and 243 rotate in the same direction (i.e. anticlockwise when viewed from the sprocket side), and each is controlled by a hydraulic throttle 255 and 257 so that the relative speed of each hydraulic motor 241 and 243 can be controlled, to control the mechanism through the relative speed relationships as illustrated in FIGS. 11 to 17, to produce the orbital/oscillatory traces as shown in FIGS. 11a to 17a.

In use this dual drive tool 15 would be mounted on a vehicle including a hydraulic pump, with controls 255 and 257 located away from the circular blade 13 and motors 241 and 243.

The dual drive arrangement of the third embodiment allows the cutting tool to be user tuned to deal with different rock strata hardness while operating the tool.

In all of these embodiments the surrounding cog has one more tooth than the surrounded cog. Different arrangements are possible where the surrounding cog has more than one tooth more than the surrounded cog, such as 2 teeth more, three teeth more and four teeth more, or even more than this. Further, in all of the described embodiments the cog difference between the outer cog and floating cog is one tooth, and the floating cog and inner cog is also one tooth, for brevity referred to as 1:1 difference. Thus 2:2, 3:3, and 4:4 differences are possible, as also are mixed differences such as 1:2, 2:1, 1:3, 3:1, 2:3, and 3:2, and so on. It is recognised that where the tooth differential increases, there is potential for the floating gear to jump, however the inventor has found that centripetal forces involved in the mechanism keep the cogs in mesh. Further, arrangements to guide the floating gear within limits to prevent any jumping can be provided.

Figure 28:
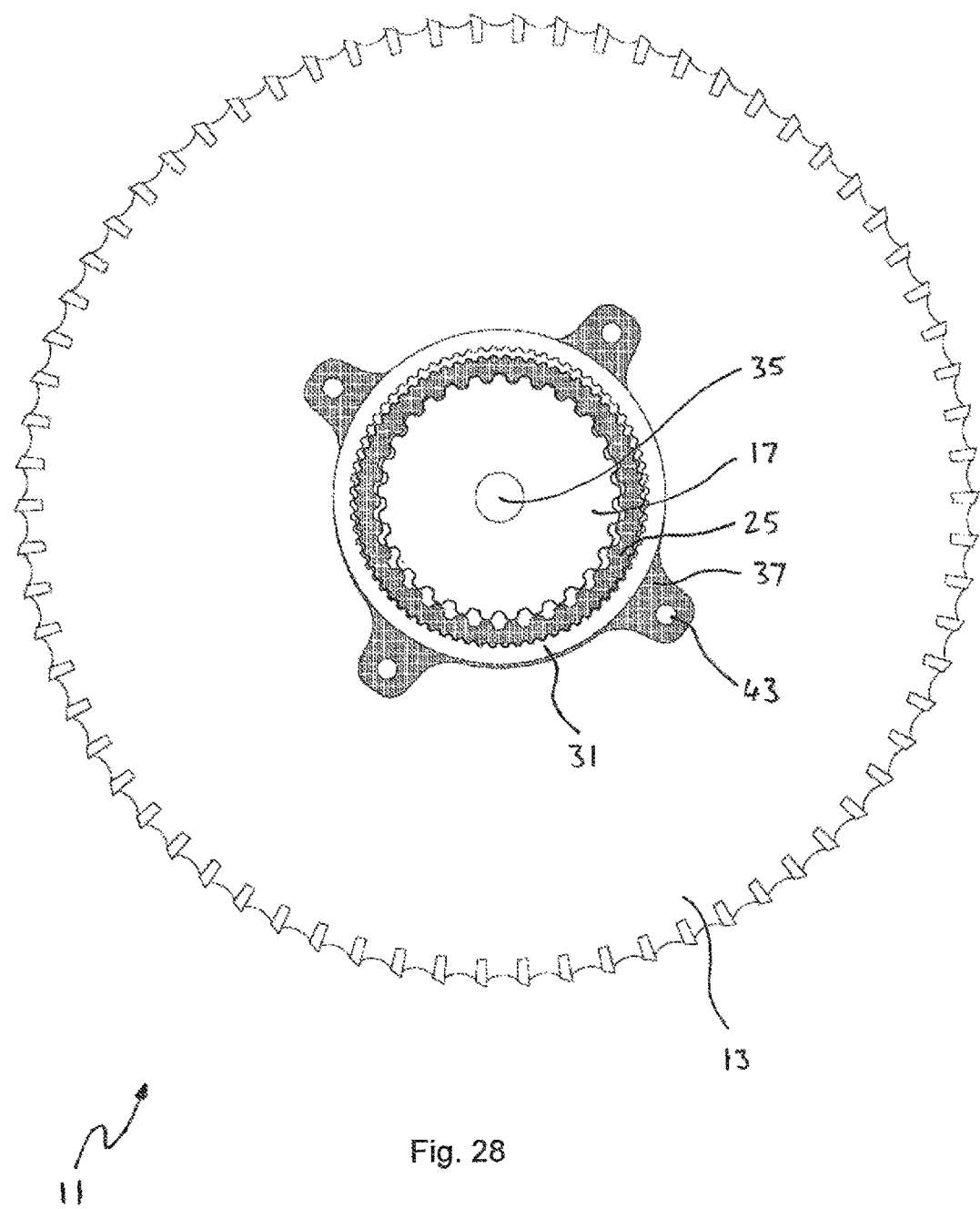
FIG. 28 is a plan view of a different configuration of a mechanism that can be employed in the first second or third embodiments.

Referring to FIG. 28, the inner cog 17 floating cog 25 meshing tooth count difference is one, while the outer cog 31 floating cog 25 meshing tooth count difference is two. It can also be seen in FIG. 28 that the outer cog 31 floating cog 25 meshing tooth pitch is smaller than that of the inner cog 17 floating cog 25 meshing tooth pitch.

Figure 29:
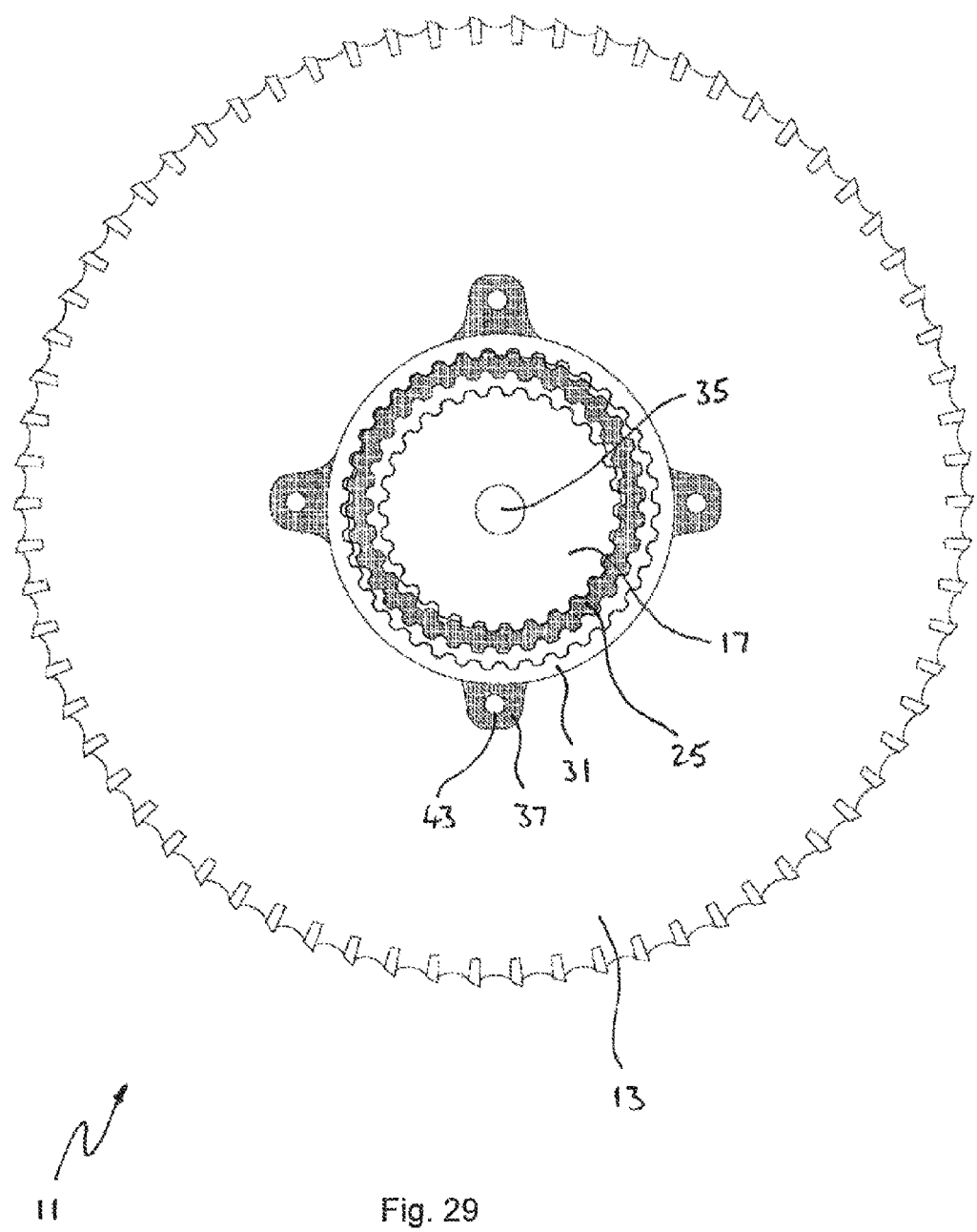
FIG. 29 is a plan view of another different configuration of a mechanism that can be employed in the first second or third embodiments.

Referring to FIG. 29, both the inner cog 17 floating cog 25 meshing tooth count difference and the outer cog 31 floating cog 25 meshing tooth count difference are two. In both cases the two meshing tooth pitches are substantially the same.

Figure 30:
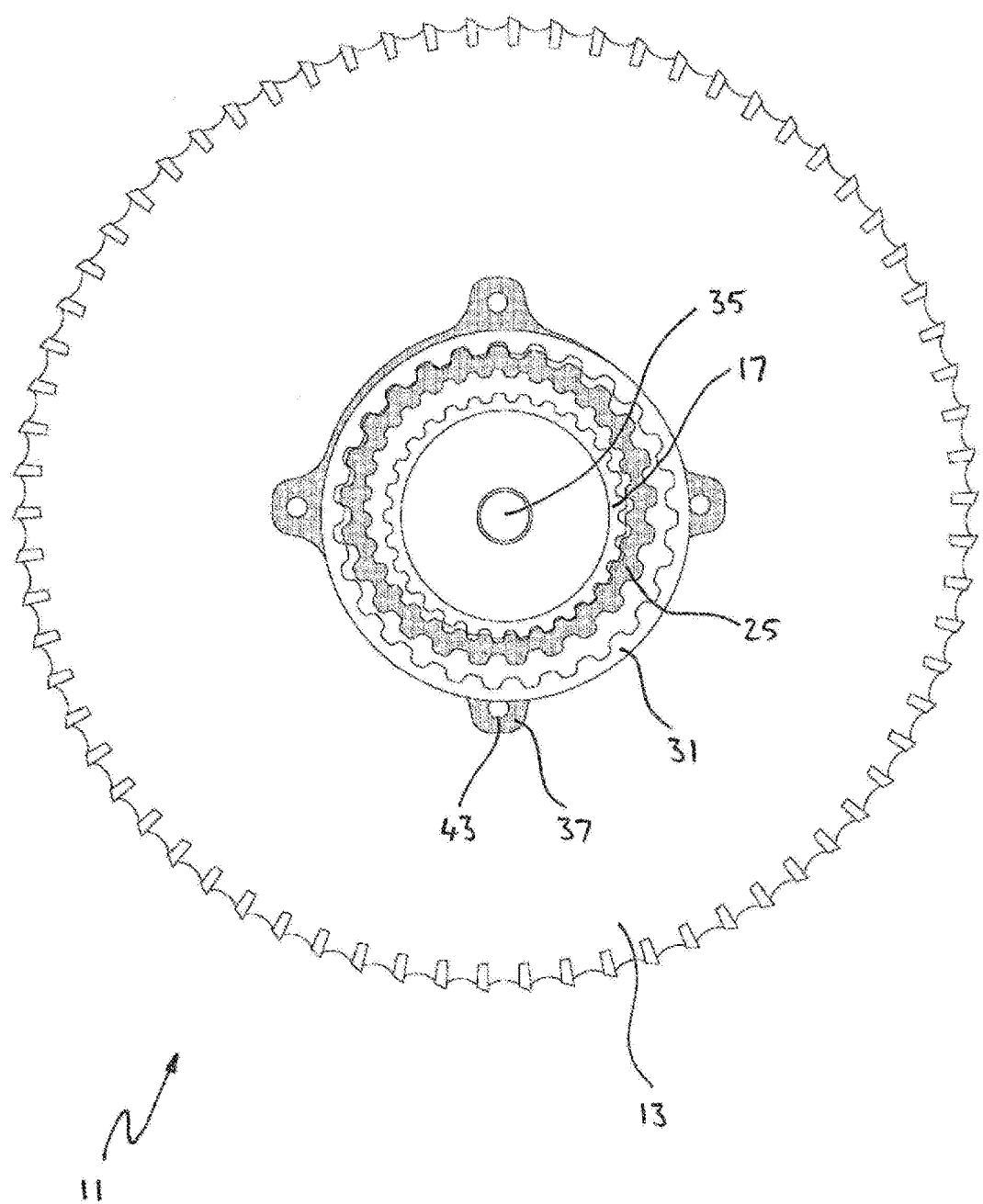
FIG. 30 is a plan view of a further different configuration of a mechanism that can be employed in the first second or third embodiments.

Referring to FIG. 30, the inner cog 17 floating cog 25 meshing tooth count difference is two, while the outer cog 31 floating cog 25 meshing tooth count difference is three. It can also be seen in FIG. 30 that the outer cog 31 floating cog 25 meshing tooth pitch is larger than that of the inner cog 17 floating cog 25 meshing tooth pitch.

Figure 31:
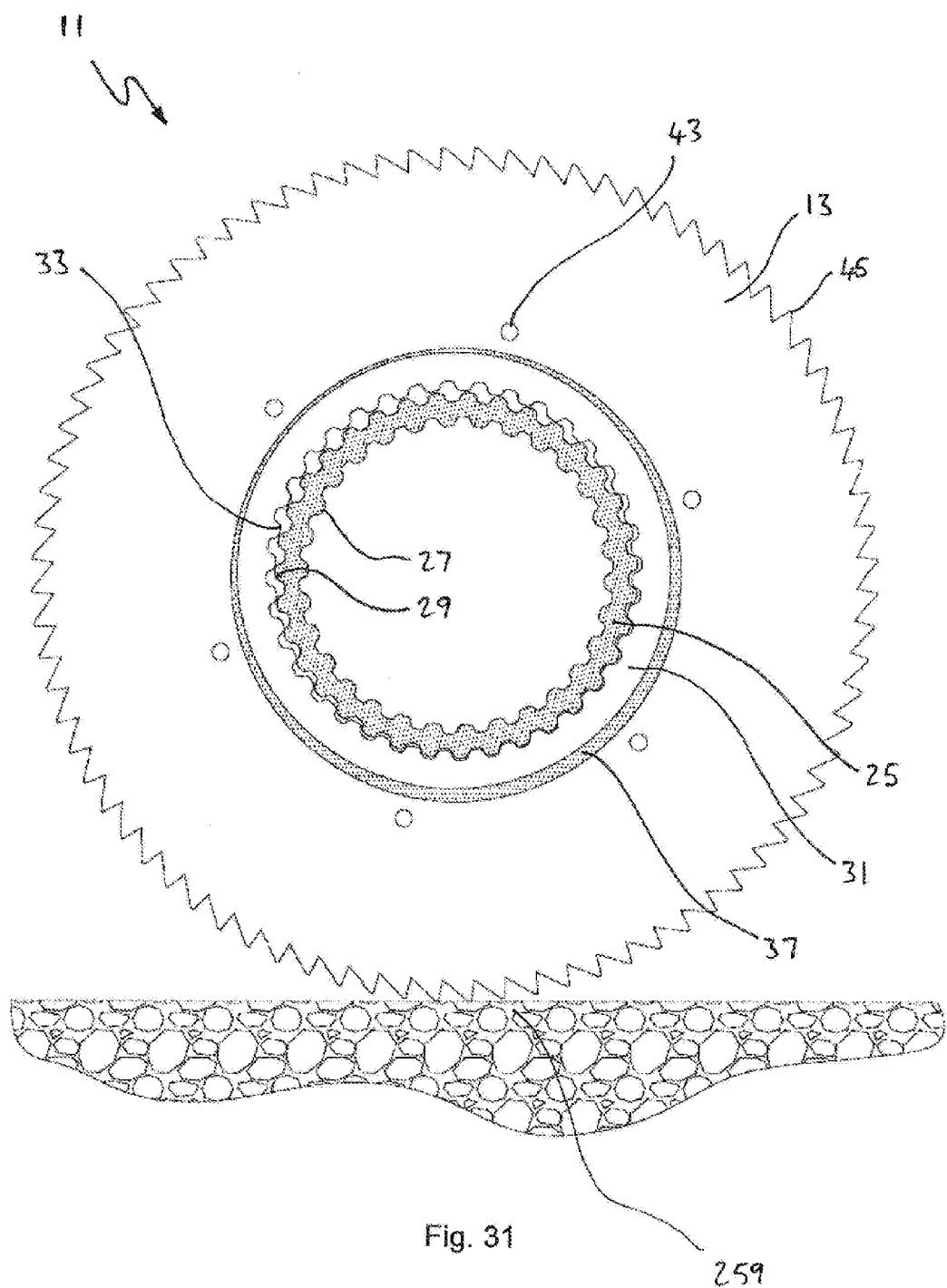
FIG. 31 illustrates a mechanism and blade for a cutting, abrading or grinding tool, in a sixth embodiment.

In FIG. 31 a mechanism 11 for a cutting/abrading/grinding tool is illustrated. The mechanism has an inner circular part in the form of floating cog 25 and a surrounding circular part in the form of outer cog 31. An input coupling (not shown) provides rotary motion to the outer cog 31. The floating cog 25 is connected to an output coupling in the form of flange 37 to which the circular blade 13 is attached and secured by rivets 43.

The floating cog 25 has an outer circumference in the region of its outwardly extending teeth 29 that is smaller than the inner circumference of the outer cog 31 in the region of its inwardly extending teeth 33, and the floating cog 25 has fewer outwardly extending teeth 29 than the number of inwardly extending teeth 33 of the outer cog 31. As can be seen there is a one tooth differential between the meshing teeth of the outer cog and the floating cog.

The floating cog 25 co-operates with the outer cog 31 by meshing of teeth 29 of the floating cog 25 with teeth 33 of the outer cog 31. The meshing teeth have matching pitch for maximum efficiency and minimal power loss.

While the floating cog is shown with inwardly extending teeth 27, these are not connected with anything, and may be omitted entirely. They are shown only because this embodiment is derived from the first embodiment. In this sixth embodiment the inner cog 17 (stator) is removed. The outer cog 31 is rotationally driven by a motor via the input shaft (not shown) relatively slowly causing the floating cog 25 with the blade 13 to also rotate. If the blade comes into contact with material 259 to be cut, it initially stalls and begins to oscillate, imparting a hammering motion into the material 259. As the speed of the motor and input shaft is increased, the blade 13, while continuing to oscillate also begins to rotate thus displacing and removing material produced as a result of the hammering action. By controlling the motor and input shaft speed, the ratio of the rotation of the blade can be varied in relation to the hammering.

In an alternative embodiment, the mechanism of the second embodiment can have its outer cog 31 removed and the inner cog 17 can co-operate with the floating cog 25, to equivalent effect, but driving via the outer cog as in the sixth embodiment provides a better mechanical advantage.

Figure 32:
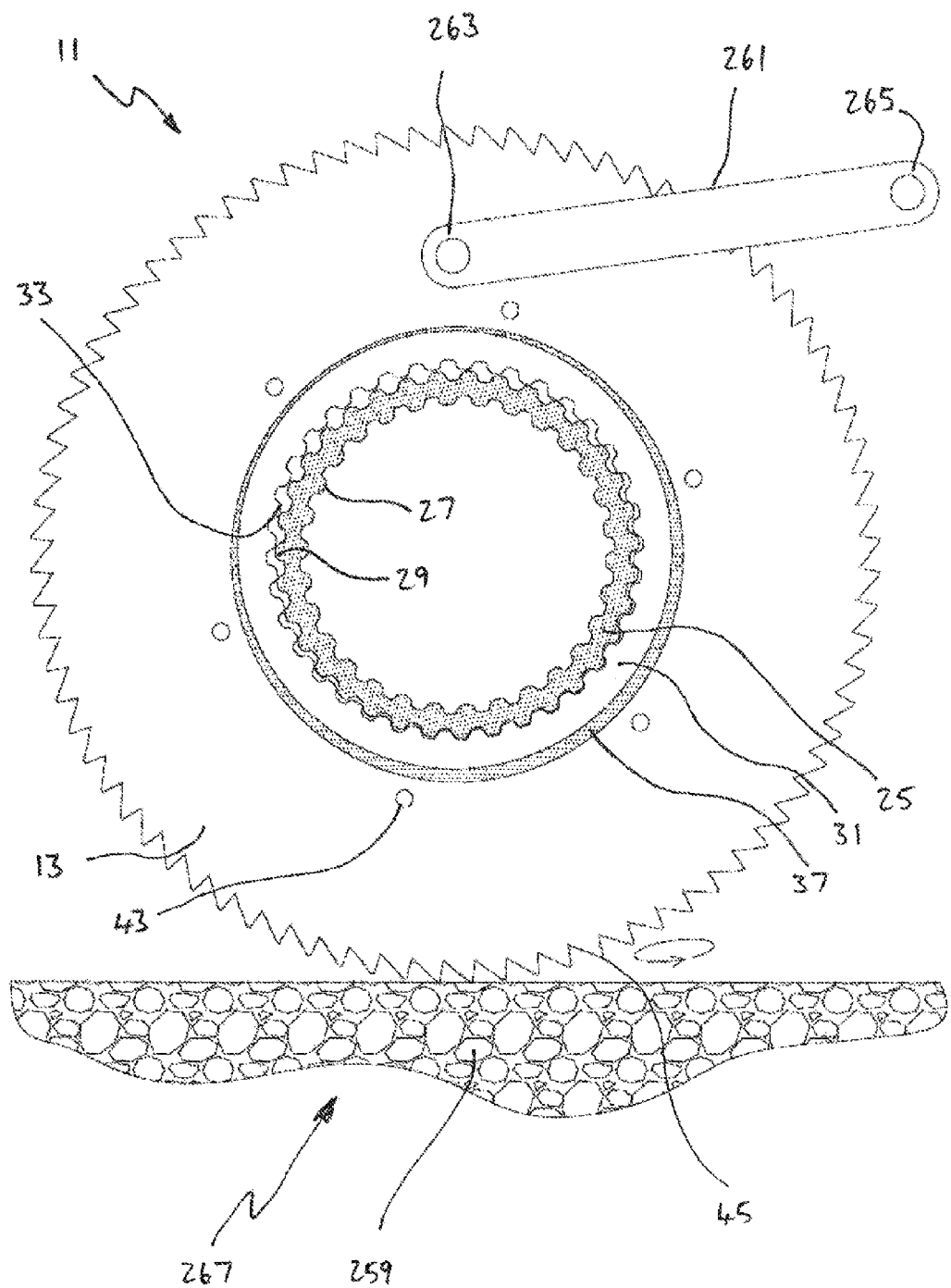
FIG. 32 illustrates a mechanism and blade for a cutting, abrading or grinding tool, in a seventh embodiment.

Referring to FIG. 32, the seventh embodiment is shown. This is identical in structure to the sixth embodiment, but includes an additional linkage 261 attached to the blade 13 at one end 263 and attached to the tool chassis at the other end 265. The function of the linkage 261 is to stall the rotation of the blade 13. This causes the teeth 45 at the section 267 opposite the attachment 269 to move in an orbital manner which can then be used as the cutting action. The effect of the linkage 261 is equivalent to the effect of the element 97 in the fourth embodiment, and the operation of the blade at the section 267 is the same as that of the blade of the fourth embodiment. The blade 13 of the seventh embodiment could be provided with a plurality of radially spaced apertures for attaching the linkage 261, so that at the teeth blunt at the section 267, the blade can be rotated and the linkage 261 attached at a different radial position.

It is believed that all of these embodiments provide a cutting action where the teeth of the blade impact and bounce away from the material. This is believed to exploit a property in concrete and similar materials that are strong in compression and weak in tension. It is believed that to get a chip in concrete, the teeth of the blade have to get enough purchase through impact, while moving in a direction at right angles to the impact, such that it causes compression in front of the tooth and tension immediately behind. It is believed that the tension propagates a crack which moves forward a short distance and then up because of a rebound wave. It is believed that the rebound wave occurs best if the teeth of the blade impact and bounce away from the material being cut.

It should be appreciated that the scope of the invention is not limited to the particular embodiments described herein.

The invention claimed is:

1. A cutting abrading or grinding tool mechanism for converting a rotary motion to an orbital, oscillatory or impact motion, said mechanism having:
    an inner circular part having teeth members extending radially outwardly; and
    a surrounding circular part having inner teeth members extending radially inwardly;
    where said inner circular part has fewer teeth members than the number of inner teeth members of said surrounding circular part;

where said inner circular part co-operates with said surrounding circular part by engagement of said inner circular part teeth members with said surrounding circular part inner teeth members;

where, as a one of said inner circular part and said surrounding circular part rotates about a central axis of an input coupling of the mechanism, an other of said inner circular part and said surrounding circular part is configured to move constrained by the engagement of said teeth members of said inner circular part and said surrounding circular part, wherein the engaging teeth members ride along and over each other to provide an orbital, oscillatory or impact motion in the other of said inner circular part and said surrounding circular part; and where the input coupling is configured for transmission of rotary motion to the one of said inner circular part and said surrounding circular part, and the other of said inner circular part or said surrounding circular part has an output coupling configured to receive a blade, the output coupling configured to transmit said orbital, oscillatory or impact motion to said blade, and said output coupling configured to oscillate between a maxima away from and a minima toward the central axis of the input coupling.

2. A mechanism as claimed in claim 1, wherein said output coupling is connected with said surrounding circular part, and said input coupling is connected with said inner circular part.

3. A mechanism as claimed in claim 1, wherein said output coupling is connected with said inner circular part, and said input coupling is connected with said surrounding circular part.

4. A cutting abrading or grinding tool mechanism for converting a rotary motion to an orbital, oscillatory or impact motion, said mechanism having:

an inner circular part having teeth members extending radially outwardly;

a surrounding circular part having inner teeth members extending radially inwardly, and outer teeth members extending radially outwardly; and an outer circular part having inner teeth member extending radially inwardly;

where said inner circular part is configured to co-operate with said surrounding circular part by engagement of said inner circular part teeth members with said surrounding circular part teeth members;

where said surrounding circular part is configured to co-operate with said outer circular part by engagement of said surrounding circular part teeth members with said outer circular part teeth members;

where said inner circular part has fewer teeth members than the number of inner teeth members of said surrounding circular part, and said surrounding circular part has fewer outer teeth members than the number of inner teeth members of said outer circular part;

where, as one of said inner circular part and said outer circular part rotates, surrounding circular part is configured to move constrained by the engagement of said teeth members of said inner circular part, said outer circular part, and said surrounding circular part, wherein the engaging teeth members ride along and over each other to provide an orbital, oscillatory or impact motion in said surrounding circular part; and where said mechanism has an input coupling configured for transmission of rotary motion to one of said inner circular part and said outer circular part, and said surrounding circular part has an output coupling configured to receive a blade, the output coupling configured to transmit said orbital, oscillatory or impact motion to said blade, and said output coupling configured to oscillate between a maxima away from and a minima toward a central axis of the input coupling.

5. A mechanism as claimed in claim 4, wherein said inner circular part has one fewer teeth members than the number of inner teeth members of said surrounding circular part, and said surrounding circular part has one fewer outer teeth members than the number of inner teeth members of said outer circular part.

6. A mechanism as claimed in claim 4, wherein the output coupling is connected with said surrounding circular part, said input coupling is connected with said inner circular part, and the outer circular part is restrained as a stator.

7. A mechanism as claimed in claim 4, wherein the output coupling is connected with said surrounding circular part, said input coupling is connected with said outer circular part, and the inner circular part is restrained as a stator.

8. A mechanism as claimed in claim 4, wherein the output coupling is connected with said surrounding circular part, said input coupling is connected with said inner circular part, and the outer circular part is connected to a further input coupling for transmission of rotary motion thereto.

9. A mechanism as claimed in claim 8, wherein the input coupling and further input coupling are independently driven, and there is provided independent control of the rotational velocity of motors driving the input coupling and further input coupling, or differential control of the rotational velocity of the rotary motion.

10. A cutting, abrading or grinding tool having a mechanism as claimed in claim 1, having a motor connected for transmission of rotary motion to the input coupling.

11. A cutting, abrading or grinding tool having a mechanism as claimed in claim 8, having a motor connected for transmission of rotary motion to the input coupling and to the further input coupling, where the rotary motion transmitted to the input coupling and to the further input coupling is in opposite directions.

12. A cutting, abrading or grinding tool having a mechanism as claimed in claim 11 including transmission componentry to transmit rotary motion to the input coupling and to the further input coupling in opposite directions.

13. A cutting, abrading or grinding tool having a mechanism as claimed in claim 9, having a first motor connected for transmission of rotary motion to the input coupling and having a second motor connected for transmission of rotary motion to the further input coupling, with the relative speeds of the first motor and second motor being controllable to adjust the movement of the output coupling.

14. A cutting, abrading or grinding tool as claimed in claim 13, wherein the motors are hydraulic rotary motors and valves are utilised to vary the flow/pressure to the hydraulic motors, to effect relative differential speed control.

15. A cutting, abrading or grinding tool having a mechanism as claimed in claim 1, further comprising the blade, the blade attached to the output coupling, the tool having a motor connected for transmission of rotary motion to the input coupling, and wherein the blade attached to the output coupling extends radially from one side of the axis of the output coupling, the tool having an anchor extending from a side of the axis of the output coupling spaced circumferentially from said blade to partially restrain motion of the output coupling.

16. A cutting, abrading or grinding tool as claimed in claim 15, wherein the blade is arcuate in configuration.

17. A cutting, abrading or grinding tool as claimed in claim 15, wherein the anchor extends from a circumferential position attached relative to said output coupling substantially opposite circumferentially to where said blade attaches to said output coupling.

18. A cutting, abrading or grinding tool as claimed in claim 15, wherein said anchor comprises a resiliently flexible member.

19. A cutting abrading or grinding tool comprising a mechanism for converting a rotary motion to an orbital, oscillatory or impact motion, said mechanism having:
- an inner circular part having teeth members extending radially outwardly;
- a surrounding circular part having inner teeth members extending radially inwardly, and
- outer teeth members extending radially outwardly; and
- an outer circular part having inner teeth member extending radially inwardly;
- where said inner circular part is configured to co-operate with said surrounding circular part by engagement of said inner circular part teeth members with said surrounding circular part teeth members;
- where said surrounding circular part is configured to co-operate with said outer circular part by engagement of said surrounding circular part teeth members with said outer circular part teeth members;
- where said inner circular part has fewer teeth members than the number of inner teeth members of said surrounding circular part, and said surrounding circular part has fewer outer teeth members than the number of inner teeth members of said outer circular part; and
- where, as one of said inner circular part and said outer circular part rotates, said surrounding circular part is configured to move constrained by the engagement of said teeth members of said inner circular part, said outer circular part, and said surrounding circular part, wherein the engaging teeth members ride along and over each other to provide an orbital, oscillatory or impact motion in said surrounding circular part;
- the cutting abrading or grinding tool further comprising a motor for supplying rotary motion to at least one of said inner circular part and said outer circular part, said surrounding circular part having an output coupling configured to receive a blade, the output coupling configured to transmit said orbital, oscillatory or impact motion to said blade, and said output coupling configured to oscillate between a maxima away from and a minima toward a central axis of the input coupling to move teeth of said blade through orbital/oscillatory traces according to relative speeds of rotation of said inner circular part and said outer circular part.

20. A mechanism as claimed in claim 19, wherein said inner circular part has one fewer teeth members than the number of inner teeth members of said surrounding circular part, and said surrounding circular part has one fewer outer teeth members than the number of inner teeth members of said outer circular part.

21. A mechanism as claimed in claim 20, wherein said motor is connected with said inner circular part, and the outer circular part is connected to a second motor for transmission of rotary motion thereto.

* * * * *